US011036037B2

(12) United States Patent
Hillman

(10) Patent No.: US 11,036,037 B2
(45) Date of Patent: Jun. 15, 2021

(54) MICROSCOPY DEVICES, METHODS AND SYSTEMS

(71) Applicant: The Trustees of Columbia University in the City of New York, New York, NY (US)

(72) Inventor: Elizabeth M. C. Hillman, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 0 days.

(21) Appl. No.: 16/348,014

(22) PCT Filed: Nov. 12, 2017

(86) PCT No.: PCT/US2017/061205
§ 371 (c)(1),
(2) Date: May 7, 2019

(87) PCT Pub. No.: WO2018/089865
PCT Pub. Date: May 17, 2018

(65) Prior Publication Data
US 2019/0302437 A1  Oct. 3, 2019

Related U.S. Application Data

(60) Provisional application No. 62/421,244, filed on Nov. 12, 2016.

(51) Int. Cl.
*G02B 21/00* (2006.01)
*G02B 21/36* (2006.01)
*G01N 21/64* (2006.01)

(52) U.S. Cl.
CPC ..... *G02B 21/0076* (2013.01); *G01N 21/6458* (2013.01); *G02B 21/0032* (2013.01);
(Continued)

(58) Field of Classification Search
CPC ............ G02B 21/0076; G02B 21/0032; G02B 21/0036; G02B 21/0048; G02B 21/008;
(Continued)

(56) References Cited

U.S. PATENT DOCUMENTS 6,038,067 A * 3/2000 George .............. G02B 21/0028
359/368
8,254,020 B2  8/2012  Holy et al.
(Continued)

FOREIGN PATENT DOCUMENTS

WO  2015109323 A3  11/2015
WO  2017210182 A1  12/2017
(Continued)

OTHER PUBLICATIONS

Author: Hillman et al., Title: Swept Confocally-Aligned Planar Excitation (SCAPE) Microscopy for High Speed Volumetric Imaging in Behaving Animals, Date: 2015, Publisher: Microscopy Society of America. (Year: 2015).*

(Continued)

*Primary Examiner* — Mark R Gaworecki
(74) *Attorney, Agent, or Firm* — Potomac Law Group, PLLC

(57) ABSTRACT

A pulsed beam of NIR excitation light is projected into a sample (345) at an oblique angle and scanned by a scanning element through a volume in the sample. 2-photon excitation excites fluorescence within the sample. The fluorescence is imaged onto an intermediate image plane that remains stationary regardless of the orientation of the scanning element. The image is captured by a linear array of light detecting elements (392) or a linear portion of a rectangular array. At any given position of the scanning element, the linear array (or portion) images all depths simultaneously. A plurality of images are captured for each of a plurality of (Continued)

different orientations of the scanning element. The orientation of the scanning element is controlled to move in a two dimensional pattern, which causes the beam of excitation light to sweep out a three dimensional volume within the sample.

20 Claims, 8 Drawing Sheets

(52) U.S. Cl.
CPC ....... *G02B 21/0048* (2013.01); *G02B 21/367* (2013.01); *G01N 2201/0675* (2013.01)
(58) Field of Classification Search
CPC ...... G02B 21/02; G02B 21/36; G02B 21/367; G01N 21/6458; G01N 2201/0675
See application file for complete search history.

(56) References Cited

U.S. PATENT DOCUMENTS

| | | | |
|---|---|---|---|
| 8,290,358 B1 | 10/2012 | Georgiev | |
| 8,619,237 B2 | 12/2013 | Hillman et al. | |
| 9,655,523 B2 | 5/2017 | Hillman et al. | |
| 10,061,111 B2 | 8/2018 | Gillman | |
| 2002/0133065 A1* | 9/2002 | Lucassen | A61B 5/6824 600/322 |
| 2003/0142934 A1 | 7/2003 | Pan et al. | |
| 2004/0207811 A1* | 10/2004 | Elsner | A61B 3/156 351/205 |
| 2006/0007534 A1* | 1/2006 | Fukuyama | G02B 21/0048 359/368 |
| 2006/0256426 A1* | 11/2006 | Wolleschensky | G01N 21/6458 359/305 |
| 2007/0272885 A1* | 11/2007 | Yamashita | G02B 21/0076 250/585 |
| 2008/0094630 A1* | 4/2008 | Mieher | G01N 21/956 356/401 |
| 2008/0285123 A1* | 11/2008 | Funk | G02B 21/002 359/388 |
| 2009/0046360 A1* | 2/2009 | Funk | G02B 21/0032 359/385 |
| 2010/0091284 A1* | 4/2010 | Mieher | G03F 7/70683 356/401 |
| 2010/0128221 A1* | 5/2010 | Muller | G02B 21/0048 351/207 |
| 2010/0168586 A1* | 7/2010 | Hillman | G02B 26/101 600/476 |
| 2011/0002024 A1* | 1/2011 | Sheblee | G02B 21/0044 359/201.2 |
| 2012/0140240 A1 | 6/2012 | Hillman et al. | |
| 2012/0220022 A1* | 8/2012 | Ehrlich | G01N 15/14 435/286.2 |
| 2012/0257037 A1* | 10/2012 | Raicu | G02B 21/002 348/79 |
| 2012/0257038 A1* | 10/2012 | Raicu | G02B 21/16 348/79 |
| 2012/0257196 A1* | 10/2012 | Raicu | G01J 3/027 356/300 |
| 2012/0330157 A1* | 12/2012 | Mandella | G02B 26/101 600/443 |
| 2013/0301096 A1* | 11/2013 | Takahashi | G02B 26/105 359/204.3 |
| 2013/0314717 A1* | 11/2013 | Yi | G01N 21/45 356/479 |
| 2014/0232848 A1* | 8/2014 | Schwedt | G02B 21/0024 348/80 |
| 2014/0340482 A1* | 11/2014 | Kanarowski | G01N 21/64 348/46 |
| 2015/0054921 A1* | 2/2015 | Dixon | G02B 21/006 348/46 |
| 2015/0130920 A1* | 5/2015 | Zou | G02B 21/245 348/79 |
| 2015/0292860 A1* | 10/2015 | Podoleanu | G01B 9/02004 356/456 |
| 2015/0362713 A1* | 12/2015 | Betzig | G02B 21/0076 250/459.1 |
| 2016/0011113 A1* | 1/2016 | Muller | G02B 21/0076 250/459.1 |
| 2016/0202164 A1* | 7/2016 | Trainer | G01N 15/0211 356/336 |
| 2016/0209646 A1* | 7/2016 | Hattori | G02B 17/008 |
| 2016/0213252 A1 | 7/2016 | Hillman et al. | |
| 2016/0320305 A1* | 11/2016 | Chen | G01J 3/0267 |
| 2016/0327779 A1* | 11/2016 | Hillman | G02B 23/04 |
| 2016/0377546 A1* | 12/2016 | Ragan | G01J 1/44 250/459.1 |
| 2017/0082845 A1* | 3/2017 | Chen | G02B 21/0048 |
| 2018/0113291 A1* | 4/2018 | Kubo | H01L 31/09 |
| 2018/0214024 A1 | 8/2018 | Hillman et al. | |

FOREIGN PATENT DOCUMENTS

| | | |
|---|---|---|
| WO | 2018013489 A1 | 1/2018 |
| WO | 2018052905 A1 | 3/2018 |
| WO | 2018064149 A1 | 4/2018 |
| WO | 2018089865 A1 | 5/2018 |

OTHER PUBLICATIONS

Bouchard et al., "Swept confocally-aligned planar excitation (SCAPE) microscopy for high-speed volumetric imaging of behaving organisms", Nature Photonics, Jan. 19, 2015, vol. 9(2), pp. 113-119.

Holekamp et al., "Fast Three-Dimensional Fluorescence Imaging of Activity in Neural Populations by Objective-Coupled Planar Illumination Microscopy", Neuron, Mar. 13, 2008, vol. 57, pp. 661-672.

International Search Report and Written Opinion for PCT/US2017/061205 dated Apr. 18, 2018.

Swoger et al., "Light-Sheet-Based Fluorescence Microscopy for Three-Dimensional Imaging of Biological Samples", Adapted from Imaging: A Laboratory Manual (ed. Yuste). CSHL Press, Cold Spring Harbor, NY, USA, Jan. 1, 2011 copyrighted 2014 (downloaded Jun. 5, 2016).

Truscott et al., "Determining 3D Flow Fields via Multi-camera Light Field Imaging", Journal of Visualized Experiments: Jove, Mar. 6, 2013, vol. 73, p. 4325.

\* cited by examiner

MICROSCOPY DEVICES, METHODS AND SYSTEMS

CROSS REFERENCE TO RELATED APPLICATIONS

This Application is a US national stage filing under 35 U.S.C. § 371 of International Application No. PCT/US2017/061205, filed Nov. 12, 2017, which claims the benefit of U.S. Provisional Application 62/421,244 filed Nov. 12, 2016, each of which is incorporated herein by reference in its entirety.

STATEMENT REGARDING FEDERALLY-SPONSORED RESEARCH

This invention was made with government support under grants NS094296, NS076628, NS063226, and NS053684 awarded by the National Institutes of Health, and 0954796 awarded by the National Science Foundation. The Government has certain rights in the invention.

BACKGROUND

A 3-dimensional imaging system called swept, confocally-aligned planar excitation (SCAPE) microscopy has been developed and described in WO 2015/109323 and US 2016/0327779, each which is incorporated herein by reference in its entirety. The SCAPE system forms three dimensional microscopic images at high speed by scanning excitation light and de-scanning image light onto a light detector such that multiple depths of the sample are detected at each instant.

SUMMARY OF THE INVENTION

Two-photon excitation in various embodiments of SCAPE can provide rapid 3D imaging enabling living anatomy to be explored at high resolution. A pulsed beam of NIR excitation light is projected into a sample at an oblique angle and scanned by a scanning element through a volume in the sample. 2-photon excitation excites fluorescence within the sample. The fluorescence is imaged onto an intermediate image plane that remains stationary regardless of the orientation of the scanning element. The image is captured by a linear array of light detecting elements or a linear portion of a rectangular array. At any given position of the scanning element, the linear array (or portion) images all depths simultaneously. A plurality of images are captured for each of a plurality of different orientations of the scanning element. The orientation of the scanning element is controlled to move in a two dimensional pattern, which causes the beam of excitation light to sweep out a three dimensional volume within the sample.

BRIEF DESCRIPTION OF THE DRAWINGS

Various embodiments are described in detail below with reference to the accompanying drawings, wherein like reference numerals represent like elements.

DESCRIPTION OF THE PREFERRED EMBODIMENTS

Figure 1:
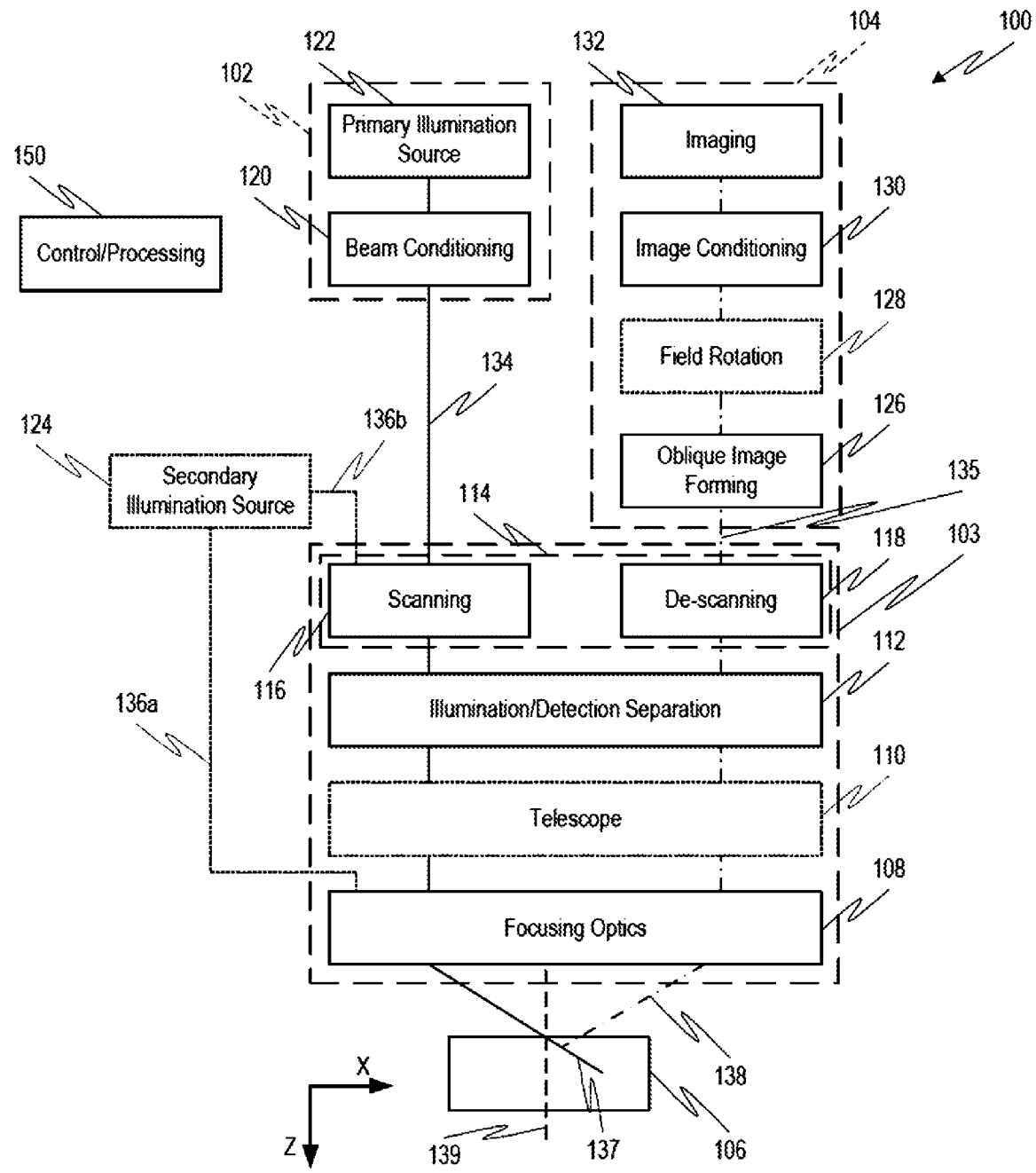
FIG. 1 shows a modular schematic that embodies a range of design alternatives for resolving images in depth at high frame rates, according to many embodiments disclosed herein.

Swept, Confocally-Aligned Planar Excitation (SCAPE) microscopy is a technique for high-speed 3D microscopy in living organisms. SCAPE can image intact living samples including the intact mouse brain and freely moving organisms such as *Drosophila melanogaster* larvae and the zebrafish heart at over 20 volumes per second.

SCAPE is a hybrid between light-sheet microscopy and confocal scanning microscopy that overcomes many of the limitations of these existing technologies:

SCAPE uses a single objective lens for both illumination and detection, making sample positioning and alignment much simpler than conventional light-sheet imaging.

SCAPE uses an oblique light sheet which is swept through the sample using a scanning mirror, capturing images of the optically sectioned illuminated plane as it sweeps. This means that SCAPE acquires 3D volumetric images without needing to physically translate the objective lens or the sample. This greatly increases achievable imaging speeds, as well as sample preparation and diversity.

SCAPE's scanning and de-scanning optics mean that the illuminated plane always stays aligned with a stationary camera providing optical sectioning with no other moving parts. When bidirectional scanning, there is no duty cycle or overhead resulting in a simple, inexpensive system with very high volumetric imaging speeds.

Embodiments of the disclosed subject matter are directed to imaging techniques in which image light from a subject is captured simultaneously from multiple depths to form one or more images, identified herewithin as depth-resolved imaging including specific embodiments that have come to be known as Swept, Confocally-Aligned Planar Excitation (SCAPE) microscopy. In particular embodiments, which include SCAPE embodiments, an illumination beam is applied to a subject of interest such that the beam traverses multiple depths. The shape of the illumination beam may be chosen to facilitate feature discrimination, for example a light sheet as in light sheet or planar illumination beam fluorescence microscopy or a pencil beam. Simultaneously with the application of the illumination beam, image light resulting from, for example, emission or reflection, is captured from the multiple depths and used to form an image. By generating, for example, an illumination beam in the form of a planar beam and scanning the planar beam while de-scanning the resulting image light, a volume may be sequentially traversed and imaged rapidly. A pencil beam may be scanned in multiple axes for a similar effect. This may be repeated to capture motion of, and within, the subject. Image capture may be provided by a two dimensional array of detectors such as a camera sensor or by a linear array for example a line array of photomultipliers.

In embodiments, a single objective is used for both illumination and detection at the sample. The terms "illumination" and "excitation" as used herein connotes any type of outgoing light used in imaging whether it excites or inhibits the emission of secondary radiation used to construct an image or is returned through some physical phenomenon such as reflection, scattering or any other means. Thus illumination light may generate image light by fluorescence excitation, reflection, scattering, second harmonic generation, Raman scattering, and/or any other mechanism. Further, the illumination energy may suppress the image light at desired locations for resolution refinement. Among other benefits, the use of a single objective for projecting illumination light and imaging may simplify subject positioning and alignment as compared to light-sheet imaging that employs separate optical components for projecting illumination and for receiving imaging light.

In embodiments, a light beam is projected through an objective into a subject along an elongate narrow or planar beam that extends into multiple depths of the subject and image light returning from the subject captured from the multiple depths simultaneously and used for imaging the features at the multiple depths. The beam may be scanned through multiple positions to allow the formation of a three-dimensional image. In an embodiment that employs illumination light in the shape of a planar beam, the subject may be optically-sectioned and the resulting image light from the illuminated plane can be captured through the same objective as the planar illumination beam is swept or otherwise repositioned. As the beam is moved, the returning image light is de-scanned and imaged onto a light detector such as a camera or linear array of detectors. The de-scanning holds a projection of the light returned from multiple-depth on the light detector. De-scanning herein refers to holding, progressively or step-wise, a certain mapping of the sources of light in the subject in the detection range of the light detector. For example, de-scanning may maintain a swept illumination planar beam in focus on the image plane of a camera. Embodiments capture or display multiple discrete, or a continuous range, of planar images to generate 3D volumetric images without physically translating the objective lens or the subject, thereby significantly increasing imaging speeds while avoiding subject preparation and selection limitations associated with other imaging modalities.

In the embodiments, a scanning element is described that employs a reflecting element, but other mechanisms for moving a beam, progressively, incrementally, or discontinuously, may be employed in any of the embodiments. Such additional embodiments may use other light-redirecting devices such as refracting or diffracting elements to scan one or narrow or planar beams of light. These may include mirrors, prisms, acousto-optic deflectors, electric lenses, spatial light modulators (SLM), resonance scanners, spinning prism or reflector scanners, beam steering mirrors or optics, flexible optical light guides or fibers, other types of adaptive optics, or any other mechanism for controlling the directions of outgoing and incoming light. Such variations are considered to be substitutable for the ones identified in any of the disclosed embodiments, including the claims, and the resulting embodiments are included in the disclosed subject matter of the present application.

In embodiments of the disclosed subject matter, the scanning and de-scanning optics are configured such that the illuminated path remains aligned with a stationary light detector (e.g., a linear or two-dimensional light sensor) that is sampled to provide optical sectioning. In embodiments, a planar illumination beam is swept through the subject by moving a scanning mirror (or multiple mirrors or other scanning device) to alter the angle (or angles) at which the illumination light is incident at the back of an objective thereby causing the position or angle at which it emerges from the objective to vary. Note that instead of a sheet beam, a planar illumination beam may be formed from multiple discrete cylindrical beams that are swept by scanning to traverse a sheet of light or by an optical element that flattens a cylindrical beam. A planar illumination beam may also be formed by multiple discrete parallel cylindrical beams that are formed at respective instants. Such a beam may be scanned in both cross-axis dimensions to capture a volume (given depth is captured at once for each position). This alteration in angle causes the illumination beam to sweep across the subject. As noted, other patterns of illumination are possible to form two dimensional or three dimensional images or even linear depth-resolved detection. Light from the illuminated region within the subject (e.g., via fluorescence excitation, reflection, scattering, second harmonic generation, and/or Raman scattering) travels back through the same objective lens and is de-scanned. By de-scanning, even though the light moves (or more generally, is repositioned) through the subject, the detected light forms an image of the illuminated region that is stationary and aligned with the illuminated region, much in the same way that a confocal pinhole stays aligned with the scanning illuminated focal point in a laser scanning confocal microscope.

De-scanning may employ multiple optical components to generate a stationary image. A camera may be focused on the image (an intermediate image) to form a further image on a light detector. An unfocused camera may be aimed at the image. The image may be formed directly on a light detector. The light detector may include a high-speed sCMOS camera, CCD camera, photomultiplier tube array, a linear detector array or any other light detection or imaging device. Alternatively, the imaging device, or an input to the imaging device, can be placed at the image plane. The single stationary objective configuration in combination with the scanning/de-scanning configuration in embodiments of the disclosed subject matter permit their use in a manner similar to other upright or inverted microscopes, or to be provided as an addition or modification to existing microscopes, such as confocal microscopes. Both scanning and de-scanning may comprehend varying the angle, position, or both angle and position of one or more of a narrow pencil beam (i.e., a low aspect ratio beam, for example one that is round) or planar beam of light.

Referring to FIG. 1, various high-level features associated with embodiments of an imaging system 100 are illustrated. Embodiments may include some or all of the features illustrated in FIG. 1, as well as other features not specifically illustrated in FIG. 1. In some embodiments, some of the features in FIG. 1 can be omitted or rearranged with respect to other features, whether illustrated or not illustrated. Moreover, the features illustrated are of simplified components performing one or more functions. Based on the general discussion of FIG. 1 and the following detailed discussion of various examples, many alternatives for performing the one or more functions represented by the simplified components will be readily apparent to one of ordinary skill.

In one or more embodiments, an imaging system 100 can be used to image a subject 106, either microscopically or macroscopically. The imaging system 100 may include, among other things, a first optical module 102 (i.e., an illumination module), a second optical module 103, and a third optical module 104 (i.e., a detection module). The illumination module 102 can provide, for example, a beam of laser light, and pre-condition the light such that it forms into a linear or planar beam within the subject 106. The pre-conditioning of the beam may cause it to form a narrow or planar illumination pattern within the subject. Optics may not themselves form a beam or plane. An SLM is an option to precondition the beam to reduce aberrations, e.g. via adaptive optics of for Bessel beam formation etc. The illumination beam can be modulated in time to create spatial patterns in the plane or otherwise patterned to create structured illumination which may then be subject to image processing to generate "super-resolution" images. The illumination module 102 can provide input light 134 for scanning to the second optical module 103 via one or more optical pathways. The detection module 104 can receive light 135 that has been reflected, scattered, and/or emitted by illuminated plane within the subject 106 in response to the incident light.

The illumination module 102 may include a primary illumination source 122, for example, a laser light source or collimated beam source. An illumination beam generated by the primary illumination source 122 can be provided to a beam conditioning module 120, which includes one or more illumination optics and/or components for conditioning the light beam to achieve a desired illumination characteristic. For example, the one or more illumination optics and/or components of the beam conditioning module 120 may include refractive, reflective, and/or diffractive optics for forming a beam into a linear or planar beam within subject 106. For example, for forming a planar illumination beam, the refractive, reflective, and/or diffractive optics may include active elements such as a scanner or passive elements such as a cylindrical lens. Alternatively or additionally, the one or more illumination optics and/or components of the beam conditioning module 120 may include beam conditioning components, such as wavelength selective filters, polarization selective or altering components, graduated neutral-density filters, modulators, etc. Alternatively or additionally, the one or more illumination optics and/or components of the beam conditioning module 120 may include an aperture that limits a size of the beam prior to any conditioning of the beam, after some or all of the conditioning of the beam, or at any other point along the optical path between the light source and the subject. Alternatively or additionally, the one or more illumination optics and/or components of the beam conditioning module 120 may include a zoom lenses (not shown, but may be disposed before focusing module 108, for example, within telescope 110, depending on the configuration of the system) that can be used to change a magnification of the second module 103 and/or an electric lens (not shown) that can be used to alter a position of the illumination with respect to the focusing module 108. Alternatively or additionally, the beam conditioning module 120 may include adaptive optics, such as a spatial light modulator (SLM), which can pre-condition the beam to reduce aberrations.

Note that in the disclosed embodiment, one or more types of aberrations may arise due to the system's function to acquire and hold focus at multiple depths (axial positions relative to the objective). These may include chromatic aberration and spherical aberration depending on designer-selected configurations. These aberrations may be reduced or eliminated using known techniques for example aspherical lenses, GRIN lenses, multiple element optics, or other techniques. In some of the embodiments, the aberrations arising in the objective are compensated by transmitting light through a lens assembly whose characteristics are selected to fully or substantially compensate the aberrations introduced by the objective. For example, a lens assembly that is identical to the objective may be used.

In some configurations, the primary illumination source 122 can be modulated in time to create spatial patterns in the illuminated plane within the subject, or otherwise patterned to create structured illumination for enhancing resolution (i.e., "super-resolution"), such as in lattice light-sheet microscopy. Alternatively or additionally, the primary illumination source 122 can generate one or more Bessel beams that form the planar illumination beam that illuminates the subject.

In some configurations, the primary illumination source 122 may include a plurality of light sources, for example, a plurality of laser light sources having different center wavelengths. In such configurations, the beam conditioning module 120 may further include optics and/or components for selection of wavelengths for illumination, for example, by switching between appropriate filters, by selective activation of a particular laser, or by moving one of the plurality of laser sources (or a corresponding input component) into a singular input position. Alternatively or additionally, the beam conditioning module 120 may include optics and/or components for combining multiple light beams into a single beam. In such a configuration, additional optics and/or components can be provided downstream of the illumination module 102, for example, by including multi-band dichroics as part of the separation module 112 and/or by employing notch filters as part of image conditioning module 130, to accommodate the simultaneous multi-wavelength illumination and resulting detected light. Alternatively or additionally, combinations of a plurality of light sources can permit stimulated emission depletion (STED) imaging, for example, by forming a combination of planar beams that yield a narrower planar beam. Alternatively or additionally, combinations of a plurality of lights sources can permit pump-probe imaging similar to stimulated Raman scattering (SRS) imaging and/or coherent anti-Stokes Raman scattering (CARS) imaging.

Other optics and/or components for the beam conditioning module 120 in addition to those specifically discussed above are also possible in any of the embodiments. Although laser sources have been described herein, any collimated light source (or light source capable of being collimated) or combination of light sources, for example, pulsed or continuous wave, can be used. In embodiments, a regenerative amplifier can be used to generate the primary illumination from source 122.

The input illumination 134 can be provided to a scanning module 116 of the second module 103. The scanning module 116 may include one or more optics and/or components for redirecting the input illumination 134 toward the subject 106 and to effect scanning of the resulting planar illumination beam within the subject. For example, the scanning module 103 may include one or more reflective elements (e.g., a movable mirror mounted on a galvanometer) to vary the optical path of the input illumination 134. After redirection by the scanning module 103, the illumination can proceed to a separation module 112, where light to be directed to the subject is separated from any detection light returning from the subject.

In some embodiments, the separation module 112 comprises one or more optical components for distinguishing between illumination and detection light. For example, the separation module 112 may include a wavelength selective beamsplitter (e.g., a dichroic mirror/filter or a dielectric mirror/filter) or a polarization selective beamsplitter so as to direct the illumination and detection light along separate optical pathways. In other embodiments, the separation module 112 comprises an arrangement of optics or components of other modules within system 100 that act to physically separate the illumination and detection light without use of a beamsplitter. Although the separation module 112 has been illustrated in FIG. 1 as after the scanning module 116 along the input light path, it is also contemplated that the separation module 112, or components thereof, can be before the scanning module 116 (and/or after de-scanning module 118 along the detected light path).

Proceeding from the scanning 116 and separation 112 modules, the input planar illumination beam proceeds to an optional telescope module 110, which may include one or more optics or components that form a telescope for imaging the input illumination onto a back aperture (or a back input plane, which may be different than the back aperture) of the focusing module 108. For example, the optional telescope module 110 can image the input illumination onto a plane that is stationary at some point relative to the objective, e.g., the back aperture, the back focal plane, or any other point depending on the desired scan pattern. Such a configuration may be advantageous in minimizing, or at least reducing, the amount light lost during a scan. Alternatively or additionally, the optional telescope module 110 can magnify the location of the incoming illumination onto the edge of the back aperture of the objective (e.g., of focusing module 108) versus the size of the scanning mirror (e.g., of scanning module 116) so that a smaller scanning mirror can be used relative to the back aperture. Similar features as a result of the magnification provided by the telescope module 110 could apply to any de-scanning mirror (e.g., of de-scanning module 118) for the detected light 138 as well. When the optional telescope module 110 is provided, it may include, for example, a pair of lenses disposed along the optical path.

The focusing module 108 (for example, objective lenses or other reflective, diffractive, or refractive focusing optical components) receives the input illumination from the telescope module 110 and focuses the illumination into a planar beam 137 at an oblique angle (i.e., with respect to an optical axis of the objective lens) within the subject 106 (or alternatively aligned with the axis—not shown—such that multiple depths within the subject are illuminated). The focusing module 108 can also serve to receive light 138 from the subject 106, for example, using the same objective lens used for forming the input planar illumination beam 137. The system 100 can be configured such that during the scanning and detection, components of the focusing module 108 and the subject 106 (or at least the imaging volume, for example, when the subject is moving independently of the imaging volume) can remain substantially stationary.

The light 138 from the subject 106 can be directed via the focusing module 108 through many of the same, or similar, modules of the second module 103 en route to the detection module 104. For example, the focusing module 108 can direct the light 138 to the telescope module 110, where it is processed by the same telescope lens grouping that imaged the input illumination onto the focusing module 108. The light 138 can be separated by separation module 112 (e.g., either specific optics or components for separation or by appropriate arrangement of input and output light paths) and de-scanned by de-scanning module 118. Alternatively, as noted above, the de-scanning by the de-scanning module 118 may occur prior to separation by separation module 112.

The de-scanning by module 118 can maintain a stationary detection plane of the imaging module 132 corresponding to the plane in the subject illuminated by the input illumination, despite the scanning motion of the illumination. The de-scanning module 118 may include one or more optics and/or components for redirecting the light from the subject. The re-directing by the de-scanning module 118 can be synchronized with the redirecting by the scanning module 116, such that the detected plane imaged by the system 100 corresponds to the plane illuminated by the system 100. In some embodiments, the scanning module 116 and the de-scanning module 118 share some of the same components (i.e., comprise a scan/de-scan module 114). In such embodiments, the scanning/de-scanning can be performed by the same mirror. In other embodiments, the scanning module 116 and the de-scanning module 118 use only separate components (e.g., employ independent mirrors). In such embodiments, the scanning can be performed by a first mirror separate from a second mirror that does the de-scanning, although the motions of the mirrors may be coordinated to maintain the desired correspondence between illuminated plane and detected light.

In some embodiments, the scan/de-scan module 114 comprises one or more reflective surface, such as tilting macroscale mirrors or facets of polygonal mirror. However, other reflective, diffractive, or refractive optical components for effective scanning/de-scanning are also possible according to one or more contemplated embodiments. For example, the scanning/de-scanning can be provided by other macroscale optical components, such as deformable mirrors or SLM, or microscale optical components, such as MEMS mirrors and digital light processors (DLP).

The resulting detected light 135 from the second module 103 can be received by the detection module 104 for further optical processing and imaging. For example, the detection module 104 may include an image-forming module 126, an optional field rotation module 128, an image conditioning module 130, and an imaging module 132. The image-forming module 126 can be designed to form an image of the illuminated plane and/or to compensate for aberrations (e.g., any aberrations that may be introduced the second module 103). Thus, the image-forming module 126 may include optics and/or components similar or identical to the optics and/or components of the optional telescope module 110 and the focusing module 108.

In one or more embodiments, the optics and/or components of the image-forming module 126 and the focusing module 108 can have respective magnifications selected to dictate the angle of the intermediate image plane formed by the imaging forming module 126. For example, by selecting the respective magnifications to produce an overall 1× magnification at the intermediate image (and taking into account any immersion medium for the objective lenses of the modules 108, 126), the angle of the intermediate image plane can be the same as the illuminated plane in the subject, i.e., with zero rotation. Changing the respective magnifications to produce overall magnifications different than 1× can change the resulting image plane angle and may introduce aberrations. Thus, the image-forming module 126, in combination with the focusing module 108 and the optional telescope module 112, can be designed to produce an image of the illuminated plane in the subject 106 at or near unity magnification. Other magnifications other than 1× are also possible according to one or more contemplated embodiments, for example, to rotate the image plane to increase light capture or for any other purpose.

The resulting image produced by the image-forming module 126 is at an oblique angle with respect to the optical axis. If imaging was performed with the detection plane of the detector to the optical axis, the light will form an image of the illuminated plane that is blurred above and below the focal plane of the focusing module 108 (e.g., the primary objective) due to the oblique angle of the image. In some embodiments, this blurring may acceptable and/or be addressed by rotating the detection plane of the detector to match or be near the image plane. In other embodiments, an optional field rotation module 128 can be used to re-orient this image plane. For example, the field rotation module 128 can use one or more optical components to rotate the image plane fully or partially to allow the image to coincide with a detection plane of the detector while maintaining the whole image (and thus all depths) in focus. Other configurations of the field rotation module 128 can address the depth-resolved image formation without actual rotation of the image plane and are discussed in further detail below.

Before, within, or after field rotation module 128 (or when field rotation module 128 is not provided, before, within, or after image-forming module 126), an image conditioning module 130 with one or more optics and/or components can be provided for conditioning the detected light (i.e., adjusting position, magnification, and/or angle of the image plane) for final detection by an imaging module 132, which may be a single detection element (e.g., a photomultiplier tube (PMT)), a linear array (e.g., a linear detector array or a linear array of PMTs), or a two-dimensional array (e.g., a CCD camera). For example, the image-forming module 130 may include optics or components for shaping the detected light or adjusting numerical aperture (e.g., adjustable apertures or irises), for wavelength selection (e.g., an emission filter or multi-color imaging components), and/or for image enhancement (e.g., image intensification or variable magnitude adjustment). Alternatively or additionally, the image conditioning module 130 may include optics and/or components for directing the light output by the field rotation module 128 (or the image-forming module 126) to the imaging module 132, for example, by focusing the output light onto an input plane of the imaging module 132.

Alternatively or additionally, the image conditioning module 130 and/or the image-forming module 126 may include one or more field lenses (not shown, but could be disposed at or near intermediate image planes), one or more wedge elements, and/or one or more reflective, refractive, or diffractive elements (e.g., mirror or spatial light modulator) to improve light collection and image formation. Rotation of the image by field rotation module 128 can result in loss of light due to the directionality of the light forming an intermediate image and the numerical aperture of the objective lens imaging the image. The field lenses can redirect this light without altering its focal plane. In an example, a field lens can be positioned at the focal plane of a relay lens set of the field rotation module.

Moreover, various combinations of lenses and glass elements, for example, incorporating combinations of concave and convex lenses in the image conditioning module 130 can be used to improve aberrations, change magnification, and/or improve through-put according to one or more contemplated embodiments. For example, the image conditioning module 130 can produce a magnification different from unity, even when the magnification produced by the combination of the second module 103 and the image-forming module 126 produce a depth-resolved image with a magnification at or near 1×. In particular, the image conditioning module 130 (together with optional field rotation module 128) can magnify the intermediate 1× image so that the desired resolution in the final image corresponds to the size of individual pixels of the detector.

The image conditioning module 130 can also use other optics or components, such as, but not limited to mirrors and mirror combinations, prisms, gratings, deformable mirrors, and spatial light modulators (SLMs) that can redirect light to form an image at a specified position and orientation. Alternatively or additionally, the image-forming module 130 may include one or more zoom lens modules (not shown). The zoom lens module can also allow alteration of the magnification of the detection module 104, for example, to match the pixel size of the detector of the imaging module 132 to image at a desired resolution. The zoom lens module or an electric lens may able so used to accommodate changes to the primary objective of the focusing module 108, for example, to change magnification. In such a configuration, the zoom lens module or electric lens can compensate for different back apertures (or back focal plane characteristics) by moving the position of the input illumination thereon. Alternatively or additionally, the position of the input illumination on the back aperture can be changed by translating the beam on the scanning mirror (e.g., of scanning module 116).

The imaging conditioning module 130 can also include, for example, a displaceable component that changes objectives (e.g., an objective of the optional field rotation module 128) to change between different desired magnifications. Thus, instead of changing the primary objective at the subject (e.g., an objective of the focusing module 108), the magnification of the final image can be changed by simply actuating the displaceable component (e.g., a turret of objectives with different magnifications) to select between different objectives. In such a configuration, the magnification of the image-forming module 126 can be changed in a corresponding manner, for example, to maintain the condition of the magnification being at or near unity, as described above.

The imaging module 132 may include various types of detecting elements and/or configurations according to one or more contemplated embodiments. In some embodiments, the imaging module 132 may include a high-speed (e.g., at least 1 MHz pixel rate, for example, 300 MHz) camera with a two-dimensional detecting element array, such as a CMOS imager, sCMOS imager, or CCD imager. Alternatively or additionally, the imaging module 132 may include a linear array of detecting elements. In some embodiments, the imaging module 132 may include a linear or two-dimensional array of high-sensitivity detecting elements, such as photomultiplier tubes, avalanche photodiodes, or single-photon avalanche diodes. Alternatively or additionally, the imaging module 132 may include one or more waveguides (e.g., optical fibers) or conduits that direct light to a series of individual detectors or an array of detector elements.

A control module 150 can be provided for processing images detected by the imaging module 132 and/or coordinating operation of the system 100. For example, control module 150 can control illumination module 102 to form the input illumination 134, such as by scanning a beam from a laser or by controlling a spatial light modulator (SLM). Alternatively or additionally, control module 150 can control the timing of illumination from or selection of wavelengths in the illumination module 102, for example, to modulate the illumination to form structured illumination. Alternatively or additionally, control module 150 can control the scanning module 116 to effect scanning of the planar illumination beam within the subject. The control module 150 can also control de-scanning module 118 to synchronize the de-scanning of the detected light 138. Alternatively, the scanning module 116 and the de-scanning module 118 can be the same (e.g., scan/de-scan module 114) and the control module 150 can control the module 114 to provide simultaneous scanning and de-scanning.

In one or more contemplated embodiments, the control module 150 can be configured to move the subject 106 (e.g., via a motorized stage) and/or the focusing module 108 (e.g., a primary objective lens). In such a configuration, the subject 106 may be sequentially illuminated from multiple directions or sides to provide more isotropic resolution.

The control module 150 can be further configured to construct one or more images (e.g., a 2-D image or combining multiple 2-D images into a 3-D image) based on the detected light by imaging module 132 and the angles of the scanning 116 and de-scanning 118 modules during the corresponding detection. Alternatively or additionally, the control module 150 can correct for the real position of the illumination planar beam 137 within the subject. For example, the control module 150 could use feedback signals from the scanning 116 and the de-scanning 118 to determine actual angles and positions of the illuminated and detected light, as well as models of the optics and/or components of the system 100. Alternatively or additionally, the control module 150 can be configured to control system 100 to perform 2-photon imaging, optical coherence tomography (OCT), structured illumination imaging, stimulated emission depletion, or any other imaging modality.

The control module 150 can also be configured to further process the images. In particular, the control module 150 can apply many different analysis and image correction strategies to improve resolution, contrast, and spatial linearity, for example. In one or more embodiments, the imaging geometry (including optics and components of the various modules of the first through third modules 102-104) can be modeled to map detecting elements (e.g., pixels of a camera) detected during a scan to 3-D Cartesian space at the object plane. This model can be stored by the control module 150 and used to generate predicted spatially-varying point spread functions (PSF) for full deconvolution of the resulting data, which can improve resolution and sectioning of the resulting images. Alternatively or additionally, the PSF can be estimated from a data set or form calibration using a standard (e.g., a phantom with fluorescent beads) or estimated using an automated algorithm. Estimating the PSF can occur before or after the conversion to Cartesian space. Deconvolution by the control module 150 may be applied before lateral shift adjustment or after lateral shift adjustment, described below.

Alternatively or additionally, radiative transport-type models of light propagation could be stored by the control module 150 and used to further correct for the effects of scattering of light (e.g., illumination planar beam 137 and/or detection light 138) to reconstruct a corrected image, similar to laminar optical tomography (LOT) or diffuse optical tomography.

Alternatively or additionally, the control module 150 can also be configured to manipulate images, for example, by applying a lateral shift adjustment to each image in compiling a 3-D model of the subject 106. Because of the angle of illumination, stacking acquired images into a simple cube does not correct for skew. In other words, each depth layer acquired at a single scan position of illumination planar beam 137 is laterally shifted with respect to the one above, which shift is dependent on the angle of the illumination planar beam 137 with respect to the optical axis 139. The control system 150 can account for this skew by laterally shifting each layer, for example, in one or more dimensions, optionally with interpolation for non-integer shifts. The amount of shift may be determined by simulation, estimation from resulting images, and/or calibration using an object, and stored by control module 150. In embodiments, the reshaping of the tilted image into Cartesian coordinates can be model-based or approximated by applying the lateral shift adjustment.

Alternatively or additionally, the control module 150 can be configured to employ diffuse background subtraction. To compensate for any undesired scattering, the system 100 can employ, for example, two-photon imaging (e.g., using longer wavelength excitation that reduces scattering of the excitation light and which produces a narrower planar beam because of the non-linearity of the two-photon effect), structured illumination (e.g., by appropriate manipulation of the primary illumination source 122 and resulting detection schema), stimulated emission depletion (STED) imaging (e.g., by selectively deactivating fluorophores in specific regions while leaving a central focal spot active to emit fluorescence in the subject), HiLo imaging (e.g., by acquiring sequential images with uniform and structured illumination and synthesizing a single image by fusing high and low spatial frequency information from both images), high-pass filtering (e.g., to accentuate higher resolution structures), low-pass filtering (e.g., to subtract low pass filtered data from the image to accentuate higher resolution structures), spatio-temporal recognition (e.g., by distinguishing features that have a distinct pattern of temporal fluctuations, similar to photoactivated localization microscopy (PALM) to stochastic optical reconstruction microscopy (STORM)), mathematical correction by extracting dynamic changes in the images and/or mathematical correction using diffuse background subtraction. For example, the control module 150 can identify common patterns in each sequential image obtained, which common pattern may shift laterally during a scan. The common pattern can be shifted, scaled, and subtracted from each image (e.g., subsequently obtained images) to isolate the differences between each measurement which correspond to the selectively subject plane.

In some embodiments, system 100 can be provided with an optional secondary illumination source 124. For example, the secondary illumination source 124 may be used to provide photo-manipulation, stimulated emission-depletion (STED), or any other desired effect on the subject independent of or in conjunction with light from the primary illumination source 122. Other optics or components (not shown) can be provided with the secondary illumination source 124 to manipulate light (e.g., beam steering or shaping) from the source 124 to provide the desired illumination effect. For example, the secondary illumination source 124 can be provided with a spatial light modulator (SLM), beam steering mirrors or optics, acousto-optic deflectors, phase plates, adaptive optics, or any other optical components to achieve the desired effect. Control module 150 can also control operation of secondary illumination source 124 in conjunction with the other modules 102-104 of system 100.

In some configurations (e.g., a photo-manipulation configuration), the secondary illumination from source 124 may be provided directly to the focusing module 108 (e.g., along beam path 136a) for irradiating the subject 106, thereby bypassing other modules of the second module 103. Photomanipulation light can be generated by any beam-shaping optical components, from simply focusing laser light at the focusing module's focal plane, to scanning with galvanometer mirrors, acousto-optic scanners, MEMs scanners, DLP devices or SLMs. For example, SLMs can be used to generate arbitrary 3-D patterns of photo-manipulation, which can be dynamically altered during imaging. Photo-manipulation may include, but is not limited to, optogenetic excitation or inhibition of cells, optical tweezing, photocoagulation, photobleaching, optically induced cell death or impairment (i.e., photothrombosis), optical cavitation for the photo-release from micro or nanoparticles, photo-uncaging, burning, reactive oxygen species generation, or any other manipulation using electromagnetic radiation.

Alternatively or additionally, the secondary illumination from source 124 may propagate along a fully or partially identical path or adjacent path through the second module 103 to that of the primary illumination. For example, in a STED configuration, the secondary illumination from source 124 can be directed along path 136*b* to an input end of the second module 103 and proceed to the subject 106 along a similar beam path as the input planar illumination beam 134. STED is a super-resolution technique that employs stimulated emission depletion to reduce the size of a diffraction limited spot or plane. In embodiments, STED can be achieved by aligning the secondary light source 124 to produce beams surrounding, bounding, or adjacent to the primary illumination. Thus, for point scanning, an annular beam spot of secondary illumination may be produced around the focal point of the primary illumination. For lines scanning, a stretched annular shape of secondary illumination can be provided around the primary line illumination. For planar beam scanning, two planar beams of secondary illumination can be provided on sides of the primary illumination planar illumination beam. Other configurations for primary and secondary illumination are also possible according to one or more contemplated embodiments. Configurations and use of the secondary illumination source other than for photo-manipulation and STED are also possible according to one or more contemplated embodiments.

Although certain features have been illustrated in FIG. 1, it will be appreciated that additional features could be added to those specifically illustrated, according to one or more contemplated embodiments. In addition, it will be further appreciated that certain features can be omitted, replaced, or revised according to one or more contemplated embodiments. While a specific order and configuration of features has been illustrated in FIG. 1, embodiments of the disclosed subject matter are not limited thereto. Rather, features may be re-ordered to achieve different configurations according to one or more contemplated embodiments. For example, the scanning 116 and de-scanning 118 modules may be positioned in the optical path between the separation module 112 and the telescope module 110, rather than between the illumination 102 and detection 104 modules and the separation module 112 as presently illustrated in FIG. 1. Other re-arrangements and re-configurations of features and modules illustrated in FIG. 1 would be apparent to one of ordinary skill in the art and fall within the scope of the present disclosure.

Moreover, system 100 can be embodied in many different configurations according to respective embodiments. For example, system 100 may be configured as a microscopy system, where focusing module 108 provides one or more microscope objectives for imaging a subject 106 held by a microscope stage. In another example, system 100 can be configured as a macroscopic (i.e., without magnification) imaging system, where focusing module 108 provides one or more high numerical aperture focusing lenses for imaging a subject. In still another example, system 100 can be miniaturized (e.g., by employing microfabricated components, for example using microelectromechanical systems (MEMS) devices and/or miniaturized imagers (e.g., semiconductor-chip imagers) and/or miniaturized light sources (e.g., laser diodes or light-emitting diodes (LEDS)) for certain applications. For example, optical components may be included in an endoscope for imaging structures internal to an organism, where light acquired by the system is processed by a detector within the endoscope or guided to a remote detector (such as PMT array) by, for example, one or more optical fibers.

Figure 2:
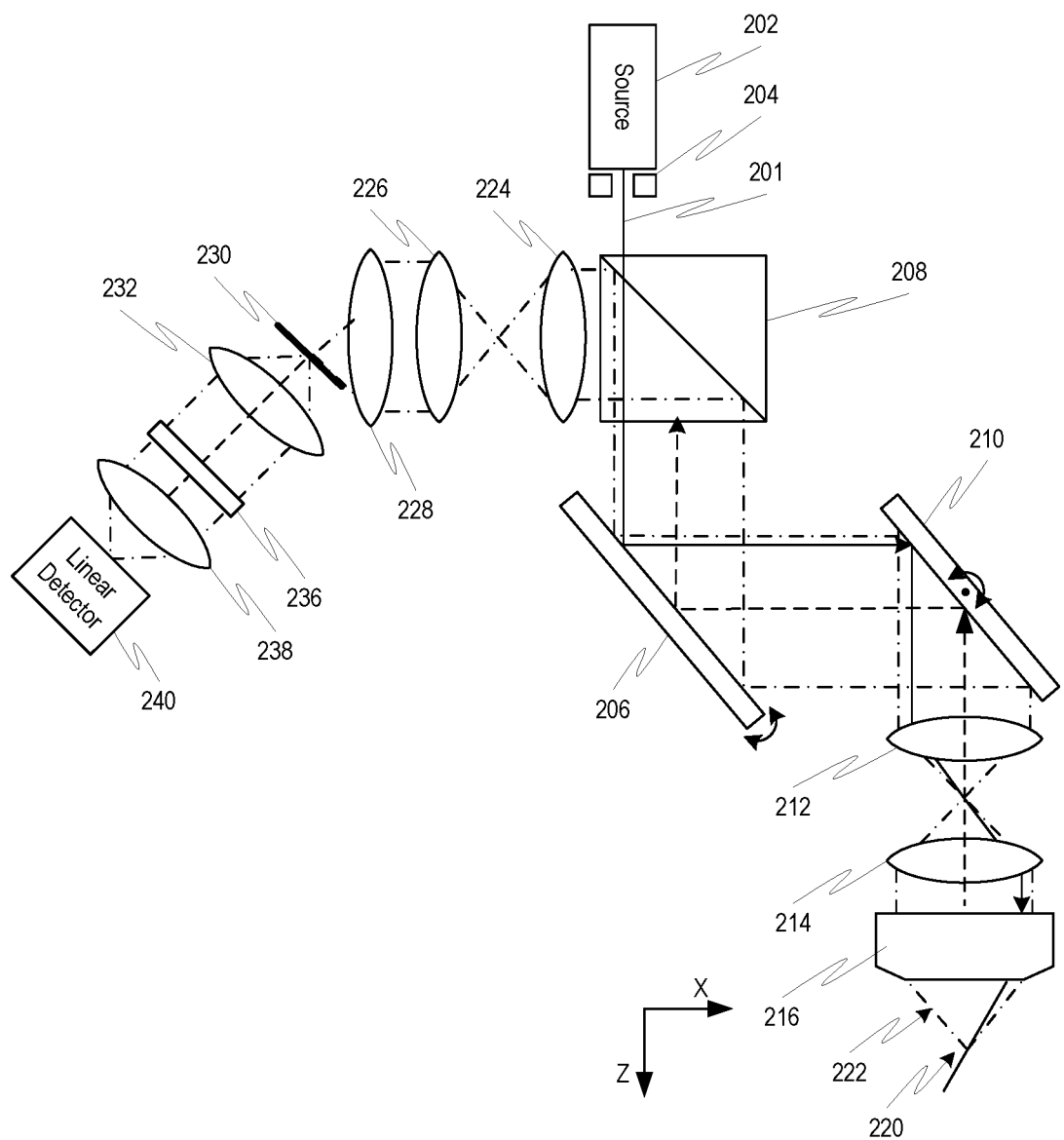
FIG. 2 shows a configuration employing a line-scan and a linear detector for depth-resolved imaging, according to one or more embodiments of the disclosed subject matter.

In one or more embodiments, a linear detector can be used to perform the depth-resolved imaging. In such configurations, a line beam (narrow beam) can be scanned rather than scanning of a planar beam. Such a configuration is illustrated in FIG. 2 and may especially useful for 2-photon imaging, for example. An excitation light source 202 (e.g., a pulsed near infrared laser source) generates an excitation beam 201, that can pass through an aperture 204 and be incident on a first scanning mirror 206 after passing through a dichroic beam splitter 208. The first scanning mirror 206 can be configured to sweep in a lateral Y-dimension. The resulting illumination line can be directed to a second scanning mirror 210. The second scanning mirror 210 can be configured to sweep the illumination in a scan dimension (e.g., in the X-Z plane). The resulting scanned beam can be mapped onto the back focal plane of objective lens 216 by a telescope formed by lenses 212, 214 and focused into the subject to form illumination beam 220. Emission light 222 (e.g., fluorescence in the range of 400-500 nm generated by excitation of fluorophores within the subject by 2 or more photons) can be captured by the objective lens 216 and mapped onto the second scanning mirror 210 by the telescope formed by lenses 212, 214. The scanning mirrors 210 and 206 de-scan the emission light and directs it to beam splitter 208.

After de-scanning by the mirrors 206 and 210, image light is reflected by the beam splitter 208 and the detected light is then mapped by another telescope formed by lenses 224, 226 onto an imaging objective lens 228 to form an intermediate image plane 230 forming an angle with the optical axis, similar to other embodiments described above. The intermediate image plane 230 can then be focused (and/or filtered, e.g., by emission filter 236) onto the pixels of linear detector 240 by lens 232 and lens 238. Note that in contrast to some of the above described embodiments, the detector 240 is a linear detector array rather than a two-dimensional imaging array. In this case, the image at the intermediate image plane 230 is a linear map of the diagonal illumination beam 220 in the Z-X plane where 2-photon emission light 222 is captured by the objective lens 216. The scanning and de-scanning by the mirrors 206 and 210 traverse the volume of the subject region. In some embodiments, the linear detector 240 is an array of photomultiplier tube elements. In some embodiments, the linear detector 240 is an array of photodiodes. The signal generated by each element of the linear detector 240 corresponds to a depth within the subject for a given line scan.

Figure 3:
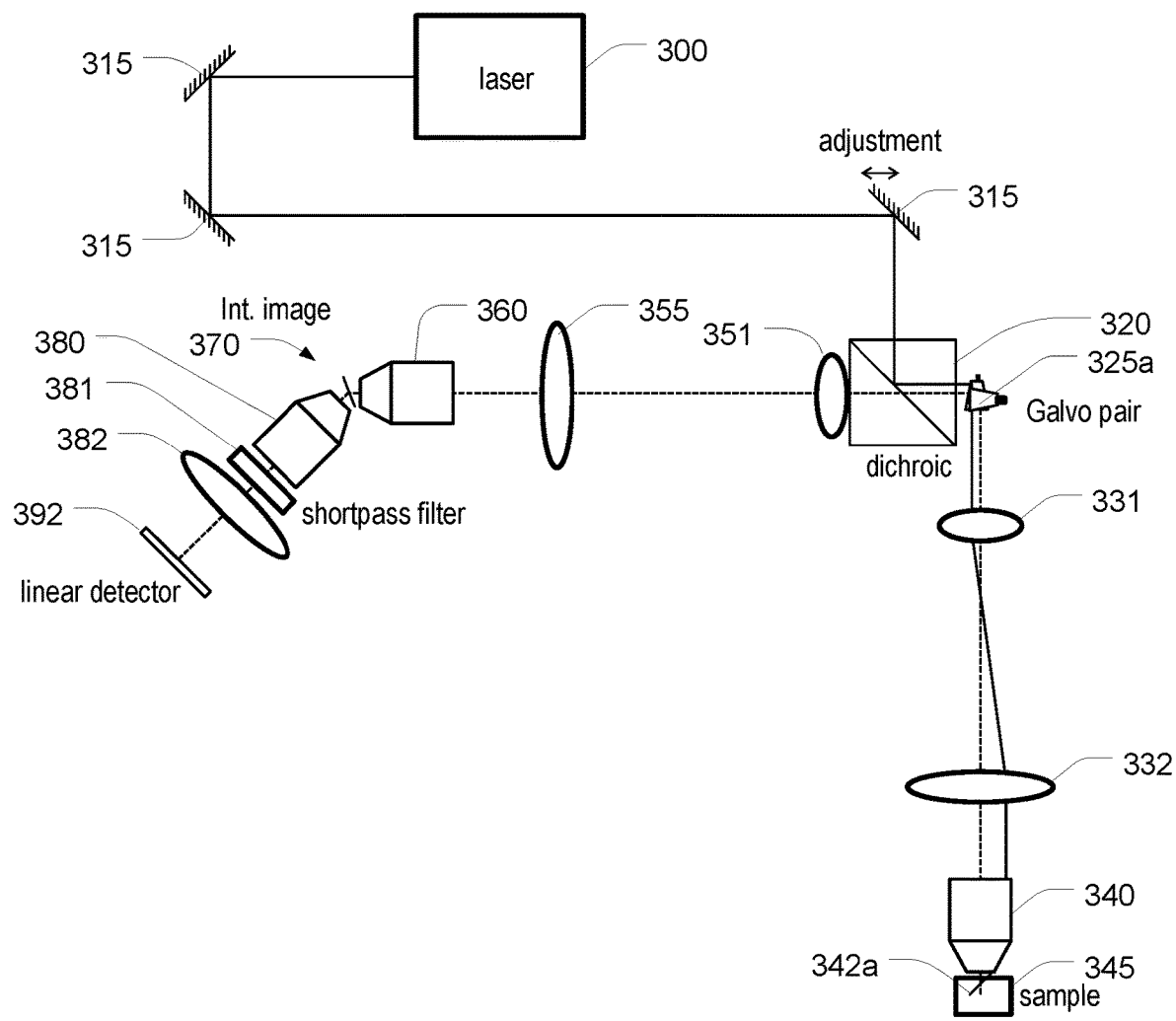
FIG. 3 shows an embodiment that scans a line of excitation light through a volume and uses a linear array to detect multiple depths simultaneously.

FIG. 3 shows another embodiment of an imaging system that scans a line (which penetrates the sample in the depth direction) and descans to achieve depth-resolved point measurements of returned light from the scanned line with the point measurements taken many-at-time by multiple photomultiplier cells of a linear array 392 with various features for high frame rate and high sensitivity. A laser 300 generates a pulsed beam of near infrared (NIR) light that is guided by mirrors 315 through a dichroic beam splitter 320 so that it is scanned by a galvo mirror pair 325a. Galvo mirror pair 325a operates to sweep a resulting pencil beam 342a in a sample 345 side to side as well as toward and away from the primary objective optical axis to sweep through a volume in the sample. Thus, the first direction of sweep is out of the plane of the drawing. Note that in alternative embodiments, instead of using a galvo mirror pair 325a, a single galvo mirror capable of moving in two different axes can be used. The NIR pencil beam 342a excites 2 photon fluorescence (e.g., green light) in the sample 345.

A high bandwidth linear detector array 392 such as one with photomultiplier elements (for example ten elements) receives the depth resolved light as the pencil beam is scanned and de-scanned by the galvo-mirror pair 325a. The image is captured with first objective 340 and lenses 332 and 331 via the galvo-mirror pair 325a, which descans the image maintaining the line of illuminated levels in the sample on the high bandwidth linear detector array 392. Further lenses 351 and 355 in combination with a second objective 360 form an intermediate image plane 370 which is imaged by a third objective 380 and projected by lens 382 onto the high bandwidth linear detector array 392 after passing through a filter 381 that passes the shorter wavelength (e.g., green) and blocks the excitation light (e.g., NIR).

Although one mechanism for image rotation is shown, any of the mechanisms described herein may be used instead. Each detector of the high bandwidth linear detector array 392 receives light from a different depth in the sample. Each may be processed by separate signal channels clocked in parallel to increase throughput and scanning speed. In addition, independently selected gain may be provided to permit optimization of the varying luminance received for each depth for the full linear depth-resolved "image." That is, light from deeper depths has a lower intensity and therefor may be compensated at a higher gain than light from shallower depths.

Figure 4:
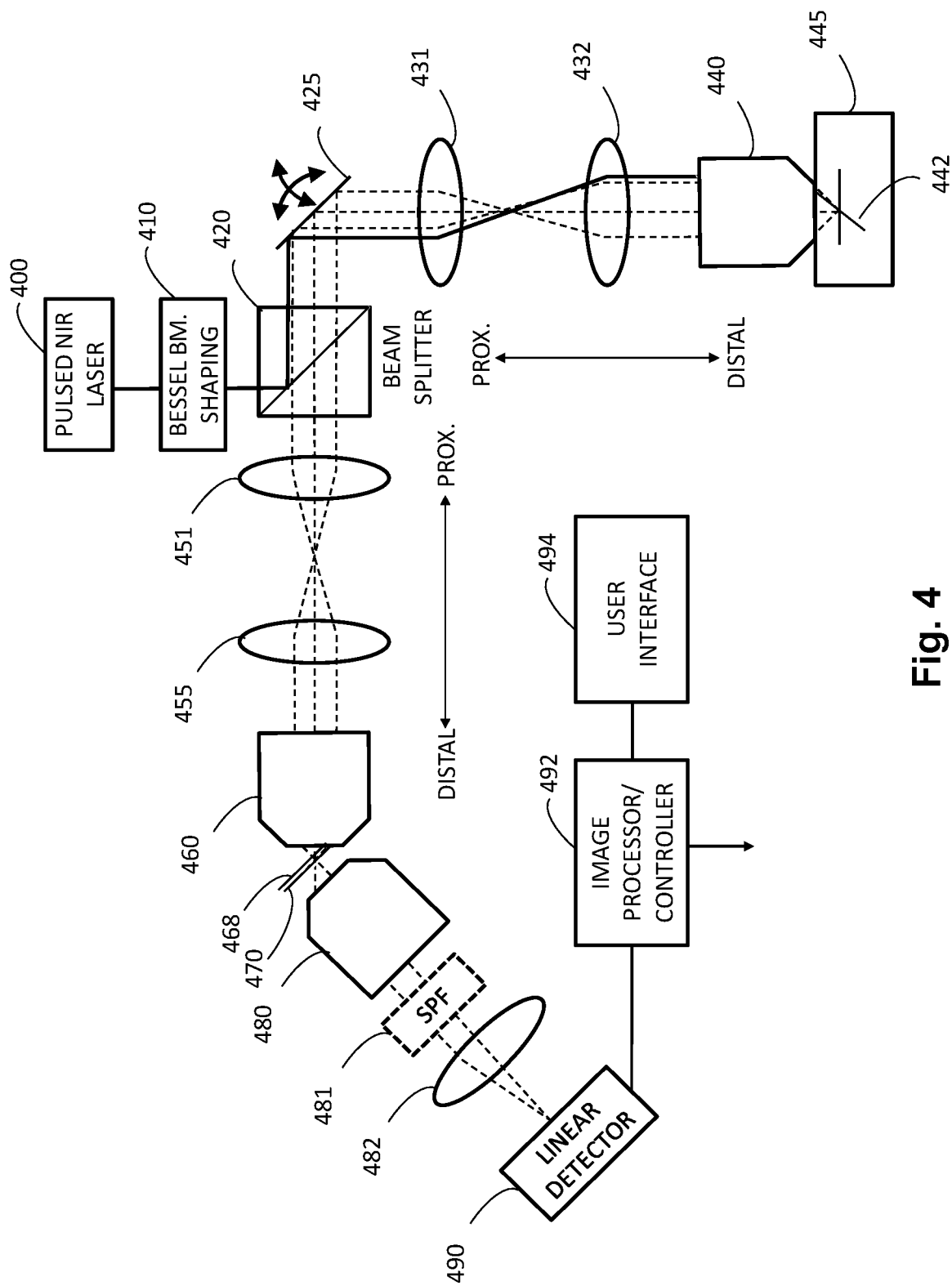
FIG. 4 shows an embodiment that scans a line of Bessel beam shaped excitation light through a volume and uses a linear array to detect 2-photon excitation from multiple depths simultaneously.

FIG. 4 depicts another embodiment that is similar to the FIG. 3 embodiment, but adds beam shaping. In this embodiment, light source 400 generates an output beam of light. In some preferred embodiments, the light source 400 is a pulsed near infrared (NIR) laser. Pulsing is advantageous in the context of two photon systems because it increases the probability of a two photon interaction with a fluorophore in the sample. And NIR is preferable to shorter wavelengths of light because the depth of penetration of NIR is deeper than visible wavelengths. In some embodiments, the wavelength of the light that is used for excitation is at least 1 μm (e.g., 1.3 or 1.6 μm). However, in alternative embodiments, light with a wavelength of at least 620 nm may also be used.

The output of the pulsed NIR laser 400 is routed through beam shaping optics 410. The beam shaping optics 410 shapes the output beam generated by the light source 400 into a Bessel beam shaped beam of excitation light. Any of a variety of approaches for generating a Bessel beam shaped beam of excitation light may be used. For example, in some embodiments, the beam shaping optics could generate a Bessel-Gauss beam by focusing a Gaussian beam using an axicon lens. In other embodiments, the beam shaping optics could operate using an alternative approach (e.g., using axisymmetric diffraction gratings, by using a static phase plate or an SLM, or by placing a narrow annular aperture in the far field.)

A wide variety of alternative approaches for shaping the output beam of the light source 400 into a Bessel beam shaped beam of excitation light can be readily envisioned by persons skilled in the relevant arts. For example, a phase modulator (e.g., an SLM) and a Fourier transforming lens may be used to generate an annular beam profile; followed by a spatial filter to clean the annular beam profile at the Fourier plane. Subsequently, the light is passed through a telescope (e.g., formed by two convex lenses) that images the annulus (via intermediate components) onto the scanning element 425 described below. In these embodiments, a decentered annulus is ultimately imaged to the back focal plane of the first objective to tilt the emerging beam 440.

The beam of excitation light that was shaped by the beam shaping optics 410 enters a beam splitter 420 (e.g., a dichroic beam splitter), and the incoming beam of light is reflected by the beam splitter 420 towards a scanning element 425. The scanning element 425 scans the beam of excitation light and also reroutes that beam into the excitation arm. In some embodiments, the scanning element 425 comprises a rapidly moving galvanometer mirror with two degrees of freedom that provides XY scanning. In alternative embodiments, the scanning element 425 could be implemented using a rapidly moving prism or any of a variety of alternative designs including MEMS light guides, SLMs, etc., that will be apparent to persons skilled in the relevant arts. In alternative embodiments, instead of using a single galvanometer mirror or a single prism that moves with two degrees of freedom, a pair of galvanometer mirrors or a pair of prisms (each of which moves with a single degree of freedom) may be combined to achieve similar results.

After being rerouted by the scanning element 425, the beam of light continues down the excitation arm in a proximal to distal direction through a first set of optical components (e.g., lenses 431, 432 and first objective 440). The beam of light then enters the tissue sample 445 at an oblique angle to penetrate the tissue sample along the Z axis, resulting in a beam of light 442. When the scanning element 425 moves (e.g., due to motion of the scanning element 425), it causes the position of the beam of light 442 within the sample to translate. Thus, the position of the beam of excitation light within the sample varies depending on the orientation of the scanning element 425. The scanning element 425 provides two dimensional scanning of light, and the orientation of the scanning element 425 is controlled to cause the position of the line-shaped beam of excitation light to sweep out a three dimensional volume within the sample 445 (with the depth direction provided by the propagation of the line-shaped beam of excitation light 442 through the sample).

In some embodiments, the position of the beam waist may be swept up and down to increase the range of the narrowest part of the beam. This can be done synchronized to detection to give even better sectioning, or done fast enough to average the effect over time. Electrically tunable lenses may be used for this to alter the divergence of the beam and thus the focal depth (beam waist position).

A beam composed of a number of axially positioned Bessel beams (or similar) e.g., one shallow, one middle and one deep could give better resolution performance than one long one. This may be accomplished using an SLM or more than one SLM and then merging the input beams to generate one long, thinner beam. The Bessel pattern may be generated using an SLM, that beam can then be split, divergence introduced into one or more of the beams, and then the beams can be re-merged.

The line-shaped beam of excitation light 442 excites 2-photon fluorescence in the sample 445, and the fluorescence originating from the illuminated region is imaged.

Notably, the wavelength of the detection light will be shorter than the wavelength of the excitation light due to the nature of 2-photon fluorescence. This could also generate second harmonic generation light, light from up-conversion (e.g. from lanthanide-based nanoparticles which can have non-linear excitation properties even with CW light sources) or Raman-scattering related interactions. Image contrast can be provided by intrinsic fluorescence, or through introduction of fluorescent markers, beads, dyes, and other substances.

The path of the detection light from the sample to the detector first passes through the first set of optical components 431-440 in a distal to proximal direction and back to the scanning element 425. From there, the detection light passes through the dichroic beam splitter 420 and into the detection arm. The detection arm includes a second set of optical components (e.g., lenses 451, 455 and second objective 460). The detection light passes through these components 451-460 in a proximal to distal direction and forms an intermediate image plane 470. (This intermediate image plane 470 is a one-dimensional analog to the intermediate image planes that are generated when a sheet of light is scanned through the sample in alternative embodiments of SCAPE.) Note that in these embodiments, an intermediate image plane is formed (as opposed to an intermediate image plane) because a line of excitation light is being projected into the sample (as opposed to a plane of excitation light) and descanning of the beam's motion is occurring in both x and y dimensions. Because the beam of excitation light 442 entered the sample at an oblique angle, the intermediate image plane corresponding to the section of the sample illuminated by the light beam 442 will be tilted with respect to the optical axis of lenses 451, 455. One of the advantages of this configuration is that the position of the intermediate image plane 470 remains stationary, regardless of changes in the position of the beam of excitation light 442 within the sample.

In some embodiments, the first set of optical components 431-440 in the excitation arm matches the second set of optical components 451-460 in the detection arm. The same scanning element 425 is used in both the excitation path and the detection path. In other embodiments, objectives with different immersion media can be accommodated by adjusting the magnification in each arm to generate magnification equal to the ratio of the refractive index of the sample immersion medium divided by the refractive index of the medium at the intermediate image plane. These configurations are advantageous because they cancel out certain optical distortions that are difficult to cancel using alternative approaches. For example, if the condition is not met because the magnification of the second set of optical components 451-460 in the detection arm is much higher than the magnification of the first set of optical components 431-440 in the excitation arm, the image that appears at the tilted intermediate image plane 470 will be distorted. In some situations, however, this distortion may be acceptable or even desirable (e.g., when the differences in magnification are used to reduce the angle of the tilted intermediate image plane). For example, in the case of the linear excitation beam, this distortion may be tolerable because the x and y resolution of the image is primarily governed by the quality of the two-photon excitation beam at the sample. The only part that will be affected is the axial sampling (since that will overlap between layers). However, if the number of depth planes is relatively small compared to conventional SCAPE (e.g. if we have 30 micron effective plane thickness rather than the more usual 1-2 micron) this effect could be insignificant. A benefit of doing this would be to capture more light (for higher effective magnification), or to be able to accommodate a detector with larger elements than the desired sample density (e.g. for direct-detection at the intermediate image plane, as described below in connection with FIGS. 5A-5B).

In some preferred embodiments, each of the lenses 431 is a f=50 mm spherical doublet; each of the lenses 432 is a f=150 mm spherical doublet; 451 is f=60 mm and 455 is f=150 mm the first objective 440 is a 20×, NA=1 water immersion objective with an effective focal length of 9 mm; the second objective 460 is a 20×, NA=0.75 air objective with an effective focal length of 10; the third objective 480 can vary to give the desired magnification for the chosen detector. The beam splitter 420 is a 710 nm short-pass dichroic mirror. In alternative embodiments, a Plossl lenses may be used in place of a single lens to obtain an effective 50 mm focal length. In some embodiments, elliptical mirrors may be used in place of lenses. Optionally, pre-conditioning may be included to account for different beam diameters of pulsed lasers.

In order to capture the image that appears at the tilted intermediate image plane 470, a variety of approaches may be used. In the FIG. 4 embodiment, a linear detector 490 is situated at a location that is remote from the intermediate image plane and optical components are used to (a) route light from the intermediate image plane 470 to the linear array 490 and (b) provide magnification. More specifically, the optical components 480, 482 act as a magnifier that expands the image and routes it to the linear light detector array 490. This magnifier includes a third objective 480 and additional optical components (e.g., lens 482). Optionally, a short pass filter 481 may be included somewhere in the optical path between the scanning element 425 and the linear detector 490. This short pass filter 481 blocks light at the wavelength of the excitation light (e.g., NIR light) but passes light at the wavelength of the fluorescence (e.g., green light). Optionally, an image splitter may be included for dual-color detection, either by placing the images side by side along the linear array, or by using two arrays. In some embodiments, a grating or prism could be used as an alternative image splitter. In some embodiments, a steerable filter or a grating/prism combined with another mirror to sequentially direct light of different emission wavelengths to the linear array may be used. In some embodiments, filters (e.g., arranged in a filter wheel) may be sequentially introduced to see different wavelengths in turn.

The linear light detector array 490 captures images of the tilted intermediate image plane 470. The linear light detector array 490 includes a plurality of light detecting elements, and each of the light detecting elements is sensitive to the fluorescence wavelength. At any given instant, the linear light detector array will capture an image of an entire line (which corresponds to multiple depths within the sample) simultaneously. Due to the movement of the line within the sample caused by the motion of the scanning element 425, and the linear array 490 sequentially captures a plurality of fluorescence-wavelength images of the intermediate image plane, each of which corresponds to a different orientation of the scanning element 425.

The images captured by the detector 490 arrive at the image processor/controller 492, which processes those images using any of a variety of well known techniques. The image processor/controller 492 also provides control functions for the entire system, including the generation of signals that control the two-dimensional pattern of the scanning element 425. In addition, the image processor/controller 492 receives signals from the user interface 494 based on commands that the user interface 494 receives from the user. The user interface 494 also provides feedback to the user based on data that originates in the image processor/controller 492.

In some embodiments, the linear light detector array comprises a linear array of elements on an sCMOS camera chip. In variations, one may use as many depths as lateral pixels (e.g. imaging 800 depths on a sCMOS camera). Optionally, extra rows may be used to enable deconvolution of the line to enhance resolution and signal to noise ratio.

In alternative embodiments, the linear light detector array 490 comprises a linear array of photodiodes. In alternative embodiments, the linear light detector array 490 comprises a linear array of photomultiplier tube (PMT) elements. This may achieve higher speed readout because of the higher sensitivity and speed of the PMT array. In alternative embodiments, the system could also use a line of optical fibers pigtailed to high-speed detectors.

Each detector element within the linear array 490 corresponds to a depth plane (or depth range) within the sample. The sample rate would be equivalent to what is needed for standard x-y scanning. PMTs allow high temporal bandwidth and permit fast readout times than typical camera-type detector arrays. For example, with a 1 MHz pixel rate with standard point-excitation, it is possible to image a single 200×200 plane at 25 frames per second. By reading each of the N detector/depth pixel out at this rate, it is possible to image N planes in parallel at 25 FPS (together a volume rate of 25 VPS). In embodiments with PMTs, even 6 detectors (depths) would be a significant improvement over the state of the art (e.g., point-scanning two-photon microscopy which must scan in depth and concomitant slower volume capture or shorter pixel integration time).

In this FIG. 4 embodiment (and also in the FIG. 5-7 embodiments described below), the scanning element 425 conjugate the back focal plane of the first objective 440 and the second objective 460. An effective excitation beam numerical aperture (e.g., ~0.04) may be provided by this process. The 2-photon line excitation is made oblique by decentering the beam at the back focal plane of the first objective 440. The image of the 2-photon fluorescent emission (forming a line) is static after the second objective 460 due to descanning by the X-Y scanning element 425; Images are acquired by sweeping the excitation line 442 through the sample by moving the scanning element 425 (e.g., in an X-Y pattern or in a different pattern). Techniques for sweeping the line through the sample known from standard confocal/2-photon microscope may be used. However, in the context of the embodiments described herein, each galvanometer position captures multiple depths, hence a single x-y scan pattern images a volume of the sample.

In this FIG. 4 embodiment, Bessel beam excitation will allow large depth of focus with a smaller beam waist compared to Gaussian beam excitation, and hence improves image resolution. Two-photon Bessel excitation also suppresses Bessel side lobes, enhancing x-y resolution.

An optical slit 468 may be positioned in the optical path of the detection light at an image plane between the scanning element 425 and the linear array 490. Optionally, the optical slit 468 may be switchable or adjustable. The slit 468 can advantageously eliminate light entering the detector array that did not directly originate from the excited line in the tissue, thereby improving resolution. In the illustrated configuration, the optical slit 468 is positioned just prior to the intermediate image plane 470. But in alternative embodiments, the optical slit 468 may be positioned at other points along the optical path of the detection light between the scanning element 425 and the linear array 490 (e.g., between the lenses 451 and 455; or just prior to the linear array 490).

In alternative embodiments, instead of using a Bessel beam shaped excitation beam, excitation beams with alternative shapes are used. Examples include, but are not limited to a series of spots at different depths, custom 3-dimensional patterns designed to provide optogenetic stimulation of target locations (e.g., within a living organism), improvements on Gaussian beams, and beams shaped to minimize excitation at the surface etc. These alternative shapes may be generated, for example, using an SLM. Optionally, when the excitation beam is a series of spots at different depths, the spacing of that series may be adjustable to facilitate 3-dimensional patterns for optogenetic stimulation.

The embodiment depicted in FIG. 4 relies on the third set of optical components 480-482 to rotate the tilted intermediate image plane 470 onto the detector 490. But because of the optical components are positioned at a significant angle with respect to the optical axis of the second set of optical components 451-460 a significant amount of light is lost, and never enters the third objective 480. As an alternative to relying on the third set of optical components 480-482 for rotation, some alternative embodiments use a phase modulating element (e.g. an SLM) that is aligned with the optical axis of the second set of optical components 451-460, and position the detector beyond that phase modulating element lined up with the same optical axis. The phase modulating element introduces a controlled aberration so as to homogenize point spread functions of points at, above, and below the focal plane when measured at the detector. With this configuration, the majority of the light that exits the second set of optical components will arrive at the detector, which may improve the signal-to-noise ratio.

Advantageously, the FIG. 4 embodiment acquires a complete line of pixels having a depth direction at any given instant. This provides a dramatic speed advantage with respect to competing technologies where only a single depth can be imaged at any given instant. This speed advantage is particularly useful for in vivo imaging, because the subject being imaged will either be moving (e.g., in the case of the heart) or at the very least, susceptible to movement.

Notably, because the FIG. 4 embodiment extends illumination in the axial (z) dimension, it requires less laser power than competing technologies (e.g. point-scanning two-photon) by providing multiple opportunities for photons to interact with a fluorophore, and better maintaining temporal coherence. The FIG. 4 embodiment also provides a significant improvement over 'axially-extended' two-photon approaches which use an axially-extended Bessel beam scanned in x and y, acquiring the sum of the resulting emitted light to produce a mean-intensity collapsed 2D stack. This is because Sum-Bessel imaging provides no 3D depth discrimination. In contrast, the FIG. 4 embodiment provides true 3D depth resolved images, even in a densely labeled mammalian brain.

In the FIG. 4 embodiment, complex depth encoding strategies are not needed if the relative depth of signals is encoded spatially. By tilting the illumination beam at an oblique angle and utilizing de-scanning, these embodiments create a stationary image of this extended beam onto a linear detector array, even as the beam is scanned in x and y at the sample. Notably, signals detected on one side of the linear array will originate from deep tissue while signal on the other side represents shallow tissue. These signals can be read out in parallel, providing multi-depth imaging at the same speeds as others achieve 2D planar x-y imaging. And no z-translation of the objective or sample, image reconstruction or unmixing is required to generate a full 3D image.

As a result, the FIG. 4 embodiment can achieve depth-resolved two-photon imaging of the brain at video rates, and can achieve the following parameters assuming imaging of 64 depths at 10 volumes per second (VPS): x-y pixel rate (all depths) of 1 MHz; Sample volume pixels (x-y-z) at 10 VPS (typ) of 316×316×64; Diffraction-limited x-y resolution of <2 microns; Sampled axial resolution of 5-20 microns; Imaging to depths of >500 microns; and Imaging depth range of 160-400 microns. In alternative embodiments, the images are captured at 10 VPS at a resolution of at least 256×256×8 (in the X, Y, and Z directions, respectively). It is preferable to ensure high efficiency transmission of returning light (and excitation light) in this configuration to maximize SNR.

Unlike other embodiments of SCAPE, the FIG. 4 embodiment uses an x-y scanned pencil beam of light rather than a scanning sheet of light. There are benefits of this scanning approach, particularly in the context of two-photon excitation. One benefit is that the laser powers needed for illuminating an axially-extended Bessel beam are much lower than those needed to form a two-photon light sheet. Imaging at 10 Hz volume rates may be achieved using a standard two-photon laser. In addition to 're-using photons', another advantage of imaging all depths in parallel with an axially-extended beam is the integration time benefit: Point-scanning a 300×300×64 volume at 10 VPS would allow only 17 ns (one 80 MHz laser pulse) per pixel, while the FIG. 4 embodiment would integrate signal over 1.1 s (90 pulses) per voxel for the same volume rate.

Another benefit is that the XY scanning of a pencil beam permits the use of a Bessel beam, which has special properties including long depths of field and beam-healing that should maximize penetration. Optionally, a spatial light modulator (SLM) may be used to provide customized beam shapes to provide brighter illumination for deeper tissues, wavefront corrections for aberrations, and to vary focus over different axial ranges (e.g. over a full 400 μm range, or a 150 μm range at a depth of 300 μm). In alternative embodiments, formation of discrete illumination points at different depths along the axial range could be used to discriminate signal from narrower axial planes within the volume, which in turn would be imaged to single detector elements.

Yet another benefit relates to scattering effects. Compared to wide-field approaches the FIG. 4 embodiment can overcome emission-light scattering by leveraging two properties. First, at any point in time, the beam is illuminating only a narrow axial line in the tissue, limiting excitation only to that line (thanks to the non-linearity of the two-photon effect). Thus, scattering of light emerging from the tissue will only impact axial resolution. Second, the descanning geometry further enables use of a slit 468, much like a confocal pinhole, which can restrict detection of light coming from the illuminated line in the tissue—an improvement over competing 'widefield' two-photon approaches.

Yet another benefit is that the FIG. 4 embodiment achieves 3D imaging with no physical z-translation of the objective lens or sample. No mechanical movement besides a standard 4,000 lines per second galvanometer scanning is required for 10 volume per sec (VPS) imaging. This benefit is particularly important for studying awake, behaving organisms. It will also circumvent motion artifacts in awake, behaving animals since a full 3D volume is sampled rapidly enabling 3D registration and avoiding loss of structures from a 2D plane.

Optionally, wavefront corrections for distortions and aberrations from forming the oblique beam through the objective may be incorporated into the FIG. 4 embodiment. Optionally, the beam of excitation light may be conditioned to deliver higher peak intensities at deeper depths to combat attenuation.

Although an 80 MHz Ti:Sapphire laser may be sufficient for use with the FIG. 4 embodiment, lower laser repetition rates can dramatically improve the two-photon signal. For example, by lowering the repetition rate from 80 MHz to 1 MHz, the number of photons in each pulse can be increased by a factor of 80×, which will have a dramatic effect on the odds of achieving a significant number of 2-photon excitations.

Figure 5A:
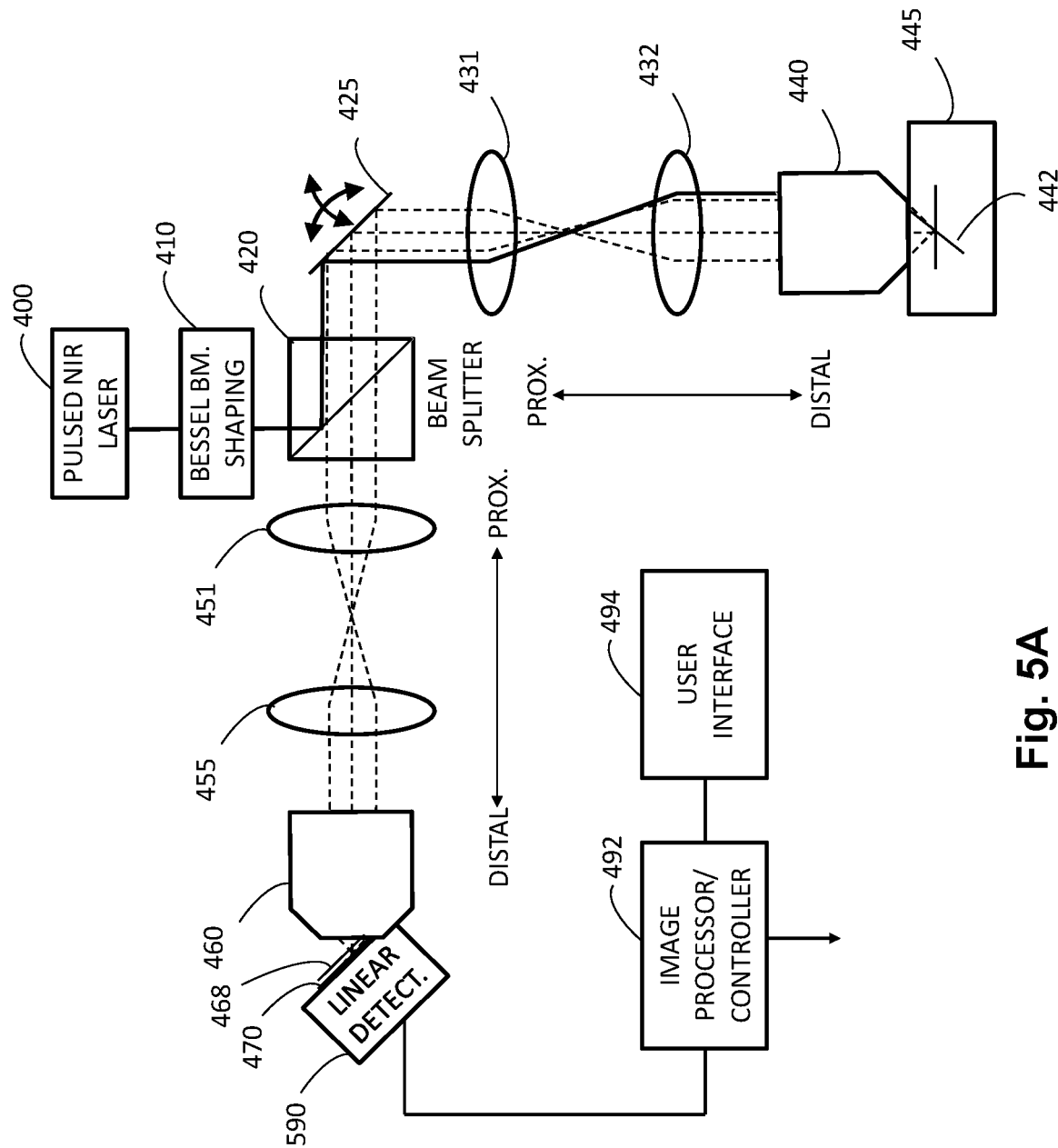
FIG. 5A shows another embodiment that is similar to the FIG. 4 embodiment, but with the linear detector situated at a different position.

FIG. 5A is similar to the FIG. 4 embodiment described above except that instead of situating the linear detector 490 at a location that is remote from the intermediate image plane, the linear array 590 in the FIG. 5A embodiment is situated at a position that coincides with the intermediate image plane 470. This approach may also be done when a linear portion of a 2D camera image sensor is used. This approach may capture more light but, depending on the upstream optics, may suffer some aberration such as chromatic as one of skill in the art will observe. The FIG. 5A embodiment shares the advantages of the FIG. 4 embodiment discussed above.

Positioning the linear array 590 to coincide with the intermediate image plane 470 works best when the detector elements are spaced sufficiently close so that the magnification provided by the first set of optical components 431-440 and the second set of optical components 451-460 produce an image at the intermediate image plane 470 that provides reasonable resolution. For example, if 10 detector elements are spaced at a 50 μm pitch, the resulting span at the intermediate image plane 470 would be 0.5 mm.

If the pitch of the detector elements is significantly larger (e.g., 1 mm), the concept of using direct incidence onto the linear detector 590 may still be used if the linear detector 590 is moved to a different position. For example, if the linear detector 590 is moved to a position between lenses 451 and 455 (at a significant tilt with respect to the optical axis between lenses 451 and 455), the lens 451 is replaced with a shorter focal length lens to de-magnify the resulting image plane and thus reduce its tilt to match the pitch of the detector elements, and all the components that are distally beyond the lens 451 are deleted, we end up with the configuration depicted in FIG. 5B.

Figure 5B:
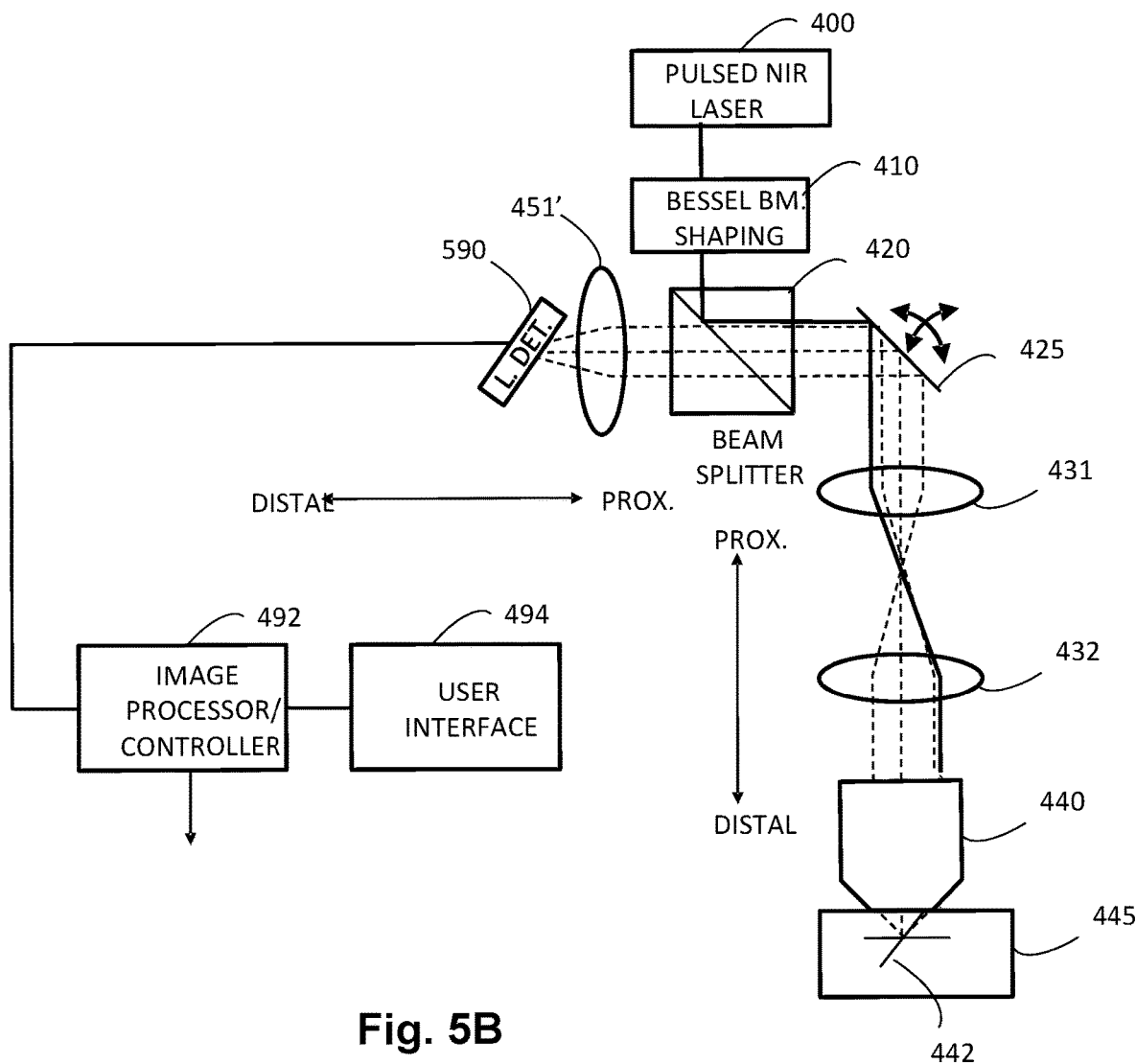
FIG. 5B shows another embodiment that is similar to the FIG. 5A embodiment, but with the linear detector situated at a different position and certain components removed.

In the FIG. 5B embodiment, the linear detector 590 will be able to capture an imperfect image that appears distally beyond the lens 451'. Optionally, a phase plate, SLM, or other approaches may be used to flatten this image to the extent possible onto the linear detector 590. Although this image will contain significant aberrations, this may not be problematic, particularly when the resolution in the depth direction is low (e.g., 8 or 16 large pixels in the depth direction). In alternative embodiments, instead of positioning the linear detector 590 in embodiment at a significant tilt with respect to the optical axis of lens 451' (as depicted in FIG. 5B), the linear detector 590 may be positioned perpendicular to that axis. And although this positioning may increase the aberrations, when the resolution in the depth direction is low enough (e.g., 6 or 8 pixels in the depth direction), these aberrations may not be problematic.

Figure 6:
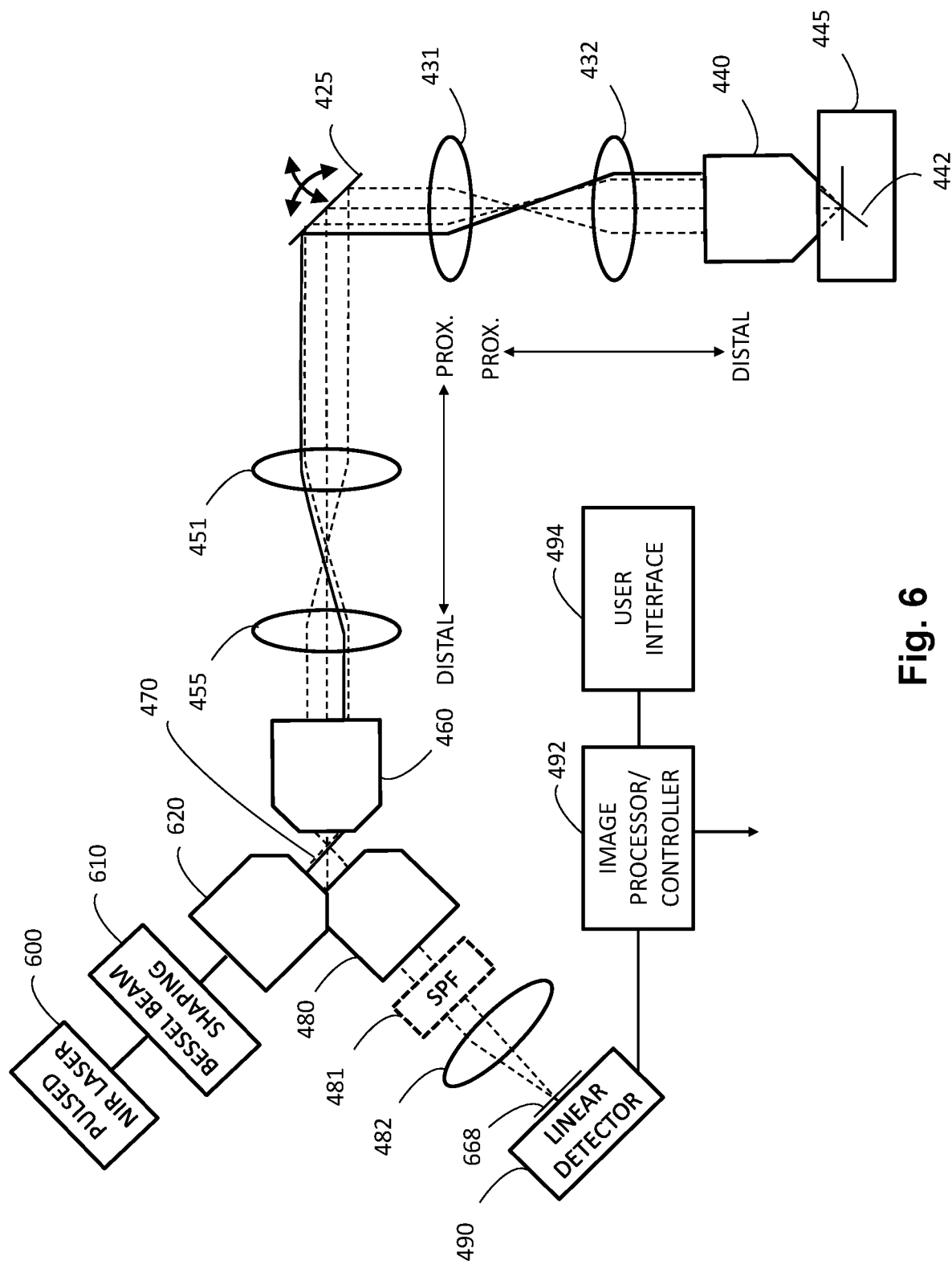
FIG. 6 shows another embodiment that is similar to the FIG. 4 embodiment, but uses a different technique for injecting the beam of excitation light.

FIG. 6 is similar to the FIG. 4 embodiment, except that instead of introducing the beam of excitation light into the system via the beam splitter 420 of FIG. 4 (which is disposed between the proximal end of the second set of optical components 451-460 and the scanning element 425), that beam splitter is omitted, and the beam of excitation light is introduced into the system by injecting the beam via the second objective 460 so that it passes in a distal to proximal direction through the second set of optical components 451-460.

One approach for accomplishing this, which is depicted in FIG. 6, uses a light source 600 followed by Bessel beam shaping optics 610 to form a beam of excitation light. The operation of the light source 600 and beam shaping optics 610 in this FIG. 6 embodiment are similar to the corresponding components 400, 410 in the FIG. 4 embodiment described above. The beam of excitation light is then introduced to the fourth objective 620. The beam of excitation light passes through a fourth objective 620 and enters the distal end of the second set of optical components 451-460. The beam of excitation light then passes through the second set of optical components 451-460 in a distal to proximal direction until it reaches the scanning element 425. Subsequently, operation of this FIG. 6 embodiment resembles that of the FIG. 4 embodiment described above. However, in this embodiment, the adjustable slit may have to be relocated to a position that is remote from the intermediate image plane 170. For example, the slit 668 may be positioned just prior to the linear detector 490. The FIG. 6 embodiment shares the advantages of the FIG. 4 embodiment discussed above. But in addition, introducing the beam of excitation light into the system as shown in FIG. 6 may also help to reduce aberrations after optimization of wavelength-dependent throughput.

Figure 7:
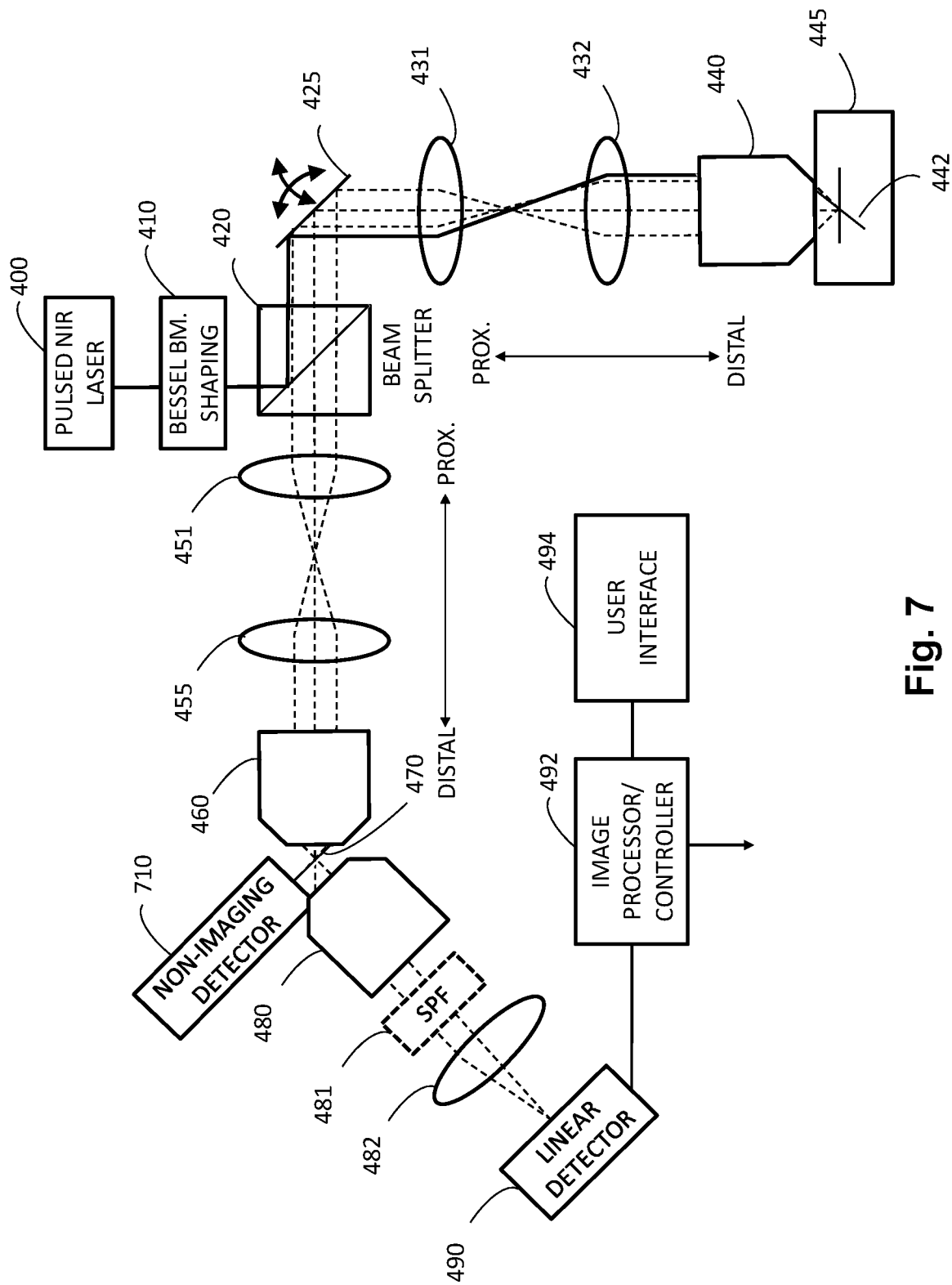
FIG. 7 shows another embodiment that is similar to the FIG. 4 embodiment, but adds a supplemental non-imaging detector.

FIG. 7 is similar to the FIG. 4 embodiment, except that the FIG. 7 embodiment adds a non-imaging detector 710 positioned to detect light that is otherwise lost. More specifically, a first part of the return light passing through the stationery tilted intermediate image plane reaches the image sensor 490 as described above in connection with FIG. 4. A second part of the return light arrives at the non-imaging photo detector 710. Signal from the non-imaging detector 710 may be used to form a flat image with no depth resolution, where depth is resolved by the imaging detector 490 by imaging light along a length of the excitation beam. The signal from the light received by the non-imaging photodetector 710 and the imaging sensor 490 can then be combined to enhance a three-dimensional representation of the distribution of return light in the tissue indicated by the signal received from the imaging sensor 490. In some embodiments, this enhancing includes adjusting the total variation in the three-dimensional distribution detected responsively to the variation along the non-depth axes indicated by the three-dimensional representation, whereby signal-to-noise in the three-dimensional representation is reduced. Optionally, the flat image and a three-dimensional representation may be output simultaneously on a display, responsively to signals from the non-imaging detector 710 and the imaging sensor 490. The FIG. 7 embodiment provides these advantages in addition to the advantages of the FIG. 4 embodiment discussed above.

In any of the 2-photon embodiments described above, reduced scattering at near-infrared wavelengths enables 2-photon laser scanning microscopy (2PLSM) to image deeper into scattering biological tissue. In contrast to conventional point-scanning implementations of 2PLSM (which are limited by slow volumetric imaging rates) the architectures described herein facilitates the capture of fast, 3D dynamics in vivo (including, e.g., an awake behaving mouse or marmoset brain). The unique single-objective geometry and scan-descan approach enables rapid movement of the illuminated plane through the sample without needing physical translation of the objective or sample. Note that in the 2-photon embodiments described above, all lenses are preferably chosen/coated to account for shared transmission of NIR and visible light. Note also that the techniques described above may be extended to 3-photon excitation, SHG, Raman, up-conversion, etc.

In any of the 2-photon embodiments described above, the detector 490 may be replaced by two or more detectors, together with a wavelength-dependent splitter that is positioned prior to those detectors. The wavelength-dependent splitter is configured to direct light of respective different wavelengths to respective detectors. This configuration is useful when the excitation beam excites multispectral fluorescence, in which case each of the respective detectors will respond to florescence at a different wavelength.

The 2-photon embodiments described above are capable of providing extended depth of penetration and improved background rejection and contrast compared to single-photon embodiments. Note that in all of the 2-photon embodiments described above, the probability of 2-photon excitation is very low and the excited fluorescence is dependent quadratically on the light intensity. Traditional techniques including but not limited to utilizing the patterned excitation and novel pulsed laser sources may be used to increase the rate of two-photon excited fluorescence.

Features of the disclosed embodiments may be combined, rearranged, omitted, etc., within the scope of the invention to produce additional embodiments. Furthermore, certain features may sometimes be used to advantage without a corresponding use of other features. It is, thus, apparent that there is provided, in accordance with the present disclosure, imaging devices methods and systems. Many alternatives, modifications, and variations are enabled by the present disclosure. While specific embodiments have been shown and described in detail to illustrate the application of the principles of the invention, it will be understood that the invention may be embodied otherwise without departing from such principles. Accordingly, Applicants intend to embrace all such alternatives, modifications, equivalents, and variations that are within the spirit and scope of the present invention.

According to embodiments, the disclosed subject matter includes an imaging apparatus with an image array has an array of photodetectors. Imaging optics positioned between a sample space and the image array to image light from the sample space onto the image array. The imaging optics has an objective through which light is received from the sample space and through which excitation light is projected by a beam projector along a beam path, such that secondary light, generated by the excitation light, is conveyed to the image array. The imaging optics is arranged to convey secondary light from respective interval along the beam path each of the photodetectors. The beam projector and imaging optics include scanning and descanning elements, controlled by a programmable scanning controller, that sweep the beam path transversely through the sample space. The control of the descanning element is effective to maintain an image of the sample regions on the image array. A readout controller that samples signals from the photodetectors to divide each sweep of the beam path to produce from each photodetector, an array of pixels developed along respective axes orthogonal to the beam path, such that each corresponds to a layer of the sample space. The spatial resolution corresponding to each array of pixels is multiple times higher than the thickness of each layer which corresponds to the respective intervals along the beam path.

In variations of the foregoing imaging apparatus, the readout controller is adjusted to sample said photodetectors at a rate to complete 10 scans of said sample regions per second. In further variations of any of the foregoing imaging apparatuses, the readout controller is adjusted to sample said photodetectors at a rate to complete 20 scans of said sample regions per second. In further variations of any of the foregoing imaging apparatuses, the readout controller is adjusted to sample said photodetectors at a rate to complete 25 scans of said sample regions per second. In further variations of any of the foregoing imaging apparatuses, the excitation light defines a pencil beam. In further variations of any of the foregoing imaging apparatuses, the pencil beam is narrower than a depth of the layers. In further variations of any of the foregoing imaging apparatuses, a programmable image processor is programmed to construct a three-dimensional model from a set of samples obtained from one or more sweeps of the excitation light. In further variations of any of the foregoing imaging apparatuses, the readout controller is connected to the image array to sample all of the photodetectors simultaneously. In further variations of any of the foregoing imaging apparatuses, the excitation light has a wavelength an integer multiple of a wavelength of the secondary light. In further variations of any of the foregoing imaging apparatuses, the photodetectors include photomultiplier tubes. In further variations of any of the foregoing imaging apparatuses, the photodetectors include photodiodes. In further variations of any of the foregoing imaging apparatuses, each photodetector includes a respective aggregate of photodiodes of an array of photodiodes. In further variations of any of the foregoing imaging apparatuses, the number of layers is 6, 20, 60, 100, 500, or 800.

In further variations of any of the foregoing imaging apparatuses, the beam projector includes an excitation light source and optical components arranged to apply light to a portion of a back aperture of the objective. In further variations of any of the foregoing imaging apparatuses, the scanning and descanning elements are portions of moving reflective elements driven by one or more motors. In further variations of any of the foregoing imaging apparatuses, the scanning and descanning elements are moved by one or more electric motors. In further variations of any of the foregoing imaging apparatuses, the excitation light emerges from the objective obliquely with an effective numerical aperture that is less than a nominal numerical aperture of the objective as a result of the excitation light underfilling a back aperture of the objective. In further variations of any of the foregoing imaging apparatuses, the effective numerical aperture is less than 0.1. In further variations of any of the foregoing imaging apparatuses, the effective numerical aperture is less than 0.05. In further variations of any of the foregoing imaging apparatuses, a beam formed from the excitation light by the objective is a pencil beam. In further variations of any of the foregoing imaging apparatuses, the objective has an optical axis and the pencil beam is oblique to the optical axis at at least one point during a sweep thereof. In further variations of any of the foregoing imaging apparatuses, the objective has an optical axis and the pencil beam is oblique to the optical axis at every point during a sweep thereof. In further variations of any of the foregoing imaging apparatuses, the excitation light has a wavelength longer than the secondary light. In further variations of any of the foregoing imaging apparatuses, the scanning and descanning are repeated continuously to generate data permitting the sample volume to be imaged at least 10 times per second for multiple seconds. In further variations of any of the foregoing imaging apparatuses, the scanning and descanning are repeated continuously to generate data permitting the sample volume to be imaged at least 20 times per second for multiple seconds. In further variations of any of the foregoing imaging apparatuses, the scanning and descanning are repeated continuously to generate data permitting the sample volume to be imaged at least 25 times per second for multiple seconds. In further variations of any of the foregoing imaging apparatuses, the scanning and descanning are repeated continuously to generate data permitting the sample volume to be imaged at least 50 times per second for multiple seconds.

In further variations of any of the foregoing imaging apparatuses, the image array is part of a scalable complementary metal-oxide semiconductor (sCMOS) camera. In further variations of any of the foregoing imaging apparatuses, a programmable image processor is programmed to construct a three-dimensional model from a set of samples obtained from one or more sweeps of the excitation light and a user interface connected to apply commands to the image process, the image processor is programmed to selectively sum signals from the photodetectors to permit a selected number of layers in the sample volume to permit a user to increase a speed of sampling of excitation light from the sample volume by selectively compromising the resolution along the beam path and increasing a speed of scanning and descanning responsively to the user input received from the user interface.

In further variations of any of the foregoing imaging apparatuses, the scanning controller is connected to receive commands from the user interface to permit a step size of the scanning and descanning to permit a transverse resolution of images also to be selected.

According to embodiments the disclosed subject matter includes a further imaging apparatus with a first set of optical components has a proximal end and a distal end, wherein the first set of optical components includes a first objective disposed at the distal end of the first set of optical components. A second set of optical components has a proximal end and a distal end. A light source generates a pulsed output beam with a first wavelength. A third set of optical components is arranged to shape the output beam generated by the light source into a beam of excitation light, the beam shape includes lobes. A scanning element provides two-dimensional scanning of light, the scanning element disposed proximally with respect to the proximal end of the first set of optical components and proximally with respect to the proximal end of the second set of optical components. The scanning element is arranged to route the beam of excitation light so that the beam of excitation light will pass through the first set of optical components in a proximal to distal direction and project into a sample that is positioned distally beyond the distal end of the first set of optical components, wherein the beam of excitation light is projected into the sample at an oblique angle, and wherein the beam of excitation light is projected into the sample at a position that varies depending on an orientation of the scanning element. The first set of optical components routes detection light from the sample in a distal to proximal direction back to the scanning element, wherein the detection light has a second wavelength that is shorter than the first wavelength. The scanning element is also arranged to route the detection light that arrives via the first set of optical components so that the detection light will pass through the second set of optical components in a proximal to distal direction and form an intermediate image plane at a stationary position that is distally beyond the distal end of the second set of optical components. A linear array of light detecting elements, wherein each of the light detecting elements is sensitive to the second wavelength, wherein the linear array is arranged to capture a plurality of second-wavelength images of the intermediate image plane that correspond, respectively, to a plurality of different orientations of the scanning element or positions of the excitation beam. A mechanism is provided for mitigating the amount of detection light resulting from excitation light in the lobes. The orientation of the scanning element is controlled to cause the position of the beam of excitation light to sweep out a three-dimensional volume within the sample.

In further variations of the foregoing further imaging apparatus, the mechanism for mitigating includes a selected wavelength and instantaneous intensity of the pulsed output beam. In further variations of any of the further foregoing imaging apparatuses, the mechanism for mitigating includes an optical slit positioned in an optical path of the detection light between the scanning element and the linear array that blocks image light from the lobes and scattered light. The slit may also provide an additional point spread function that may improve resolution. In a method, any of the further foregoing imaging apparatuses is provided and the method includes selecting the wavelength and instantaneous intensity of the pulsed output beam such that the amount of image light from the lobes is less than one percent of the amount of light received from a main part of the beam. The foregoing method may be such that the selecting is such that the amount of image light received from the lobes is zero.

In further variations of any of the further foregoing imaging apparatuses, the first wavelength is at least 620 nm. In further variations of any of the further foregoing imaging apparatuses, the optical slit is situated adjacent to the intermediate image plane. In further variations of any of the further foregoing imaging apparatuses, the third set of optical components generate a Bessel beam or a Bessel-Gauss beam. In further variations of any of the further foregoing imaging apparatuses, the third set of optical components operates by focusing a Gaussian beam using an axicon lens. In further variations of any of the further foregoing imaging apparatuses, the third set of optical components comprises a spatial light modulator. In further variations of any of the further foregoing imaging apparatuses, the linear array is situated at a position that coincides with the intermediate image plane. In further variations of any of the further foregoing imaging apparatuses, the linear array is situated at a position that is remote from the intermediate image plane, and wherein the imaging apparatus further comprises optical components arranged to (a) route light from the intermediate image plane to the linear array and (b) provide magnification. In further variations of any of the further foregoing imaging apparatuses, a wavelength-selective filter is positioned in the optical path of the detection light between the scanning element and the linear array that prevents light has the first wavelength from reaching the linear array. In further variations of any of the further foregoing imaging apparatuses, each of the light detecting elements of the linear array comprises a photodiode or a photomultiplier tube element. In further variations of any of the further foregoing imaging apparatuses, a beam splitter is arranged to (a) route the excitation light that was shaped by the third set of optical components towards the scanning element. and (b) route the detection light arriving from the scanning element through the second set of optical components. In further variations of any of the further foregoing imaging apparatuses, the second set of optical components includes a second objective disposed at the distal end of the second set of optical components. In further variations of any of the further foregoing imaging apparatuses, optical components are providing that include a third objective arranged to route the excitation light that was shaped by the third set of optical components into the distal end of the second objective such that the excitation light will travel through the second set of optical components in a distal to proximal direction towards the scanning element. In further variations of any of the further foregoing imaging apparatuses, the first wavelength is at least 1 µm.

According to embodiments, the disclosed subject matter includes an imaging method. The method includes projecting a pulsed Bessel beam of NIR excitation light into a sample at an oblique angle at a sufficient intensity to induce 2-photon excitation of fluorescence within the sample. The method further includes scanning the beam of excitation light through a volume in the sample at a speed that is sufficient to sweep the beam through a three-dimensional region of the sample at at least 10 volumes per second, with a resolution in each volume of at least 256×256×8 in the X, Y, and depth directions, respectively. The method further includes imaging fluorescence that originates from the position of the beam of excitation light onto an intermediate image plane that remains stationary while the beam of excitation light is scanned. The method further includes capturing, using a linear array of light detecting elements, a plurality of images of the intermediate image plane that correspond, respectively, to a plurality of different scanning orientations. The fluorescent light passes through an optical slit prior to arriving at the linear array of light detecting elements.

In any of the foregoing embodiments that include NIR excitation light, the NIR excitation light may have a wavelength of at least 1 µm.

According to embodiments, the disclosed subject matter includes a still further imaging apparatus with a light source that generates a pulsed Bessel beam of excitation light at a first wavelength, wherein the first wavelength is at least 620 nm. An optical system (a) projects the beam of excitation light into a sample at an oblique angle, wherein a position of the beam of excitation light within the sample varies depending on an orientation of a scanning element that provides two dimensional scanning of light, and (b) forms, from detection light that originates from the position of the beam of excitation light, an image at an intermediate image plane, wherein the intermediate image plane remains stationary regardless of the orientation of the scanning element, and wherein the detection light has a second wavelength that is shorter than the first wavelength. A linear array of light detecting elements is provided. Each of the light detecting elements is sensitive to the second wavelength, wherein the linear array is arranged to capture a plurality of second-wavelength images of the intermediate image plane that correspond, respectively, to a plurality of different orientations or positions of the scanning element or the excitation beam. An optical slit is positioned in an optical path of the detection light between the scanning element and the linear array. The orientation of the scanning element is controlled to cause the position of the beam of excitation light to sweep out a three-dimensional volume within the sample. The optical slit is situated adjacent to the intermediate image plane. The Bessel beam of excitation light is generated using a spatial light modulator. The linear array is situated at a position that coincides with the intermediate image plane. The linear array is situated at a position that is remote from the intermediate image plane, and wherein the imaging apparatus further comprises optical components arranged to (a) route light from the intermediate image plane to the linear array and (b) provide magnification.

In further variations of any of the foregoing still further imaging apparatuses, a wavelength-selective filter is positioned in the optical path of the detection light between the scanning element and the linear array that prevents light has the first wavelength from reaching the linear array. In further variations of any of the foregoing still further imaging apparatuses, each of the light detecting elements of the linear array comprises a photodiode or a photomultiplier tube element. In further variations of any of the foregoing still further imaging apparatuses, the first wavelength is at least 1 µm.

According to additional embodiments, the disclosed subject matter includes an imaging apparatus with a first set of optical components has a proximal end and a distal end, wherein the first set of optical components includes a first objective disposed at the distal end of the first set of optical components. A second set of optical components has a proximal end and a distal end. A light source that generates a pulsed output beam with a first wavelength, wherein the first wavelength is at least 620 nm. A third set of optical components arranged to shape the output beam generated by the light source into a Bessel beam shaped beam of excitation light. A scanning element provides two-dimensional scanning of light, the scanning element disposed proximally with respect to the proximal end of the first set of optical components and proximally with respect to the proximal end of the second set of optical components. The scanning element is arranged to route the beam of excitation light so that the beam of excitation light will pass through the first set of optical components in a proximal to distal direction and project into a sample that is positioned distally beyond the distal end of the first set of optical components, wherein the beam of excitation light is projected into the sample at an oblique angle, and wherein the beam of excitation light is projected into the sample at a position that varies depending on an orientation of the scanning element. The first set of optical components routes detection light from the sample in a distal to proximal direction back to the scanning element, wherein the detection light has a second wavelength that is shorter than the first wavelength. The scanning element is also arranged to route the detection light that arrives via the first set of optical components so that the detection light will pass through the second set of optical components in a proximal to distal direction and form an intermediate image plane at a stationary position that is distally beyond the distal end of the second set of optical components. A linear array of light detecting elements is provided, wherein each of the light detecting elements is sensitive to the second wavelength, wherein the linear array is arranged to capture a plurality of second-wavelength images of the intermediate image plane that correspond, respectively, to a plurality of different positions and/or orientations of the scanning element or positions and/or orientations of the excitation beam. An optical slit is positioned in an optical path of the detection light between the scanning element and the linear array. The orientation of the scanning element is controlled to cause the position of the beam of excitation light to sweep out a three-dimensional volume within the sample.

In variations of the additional embodiments, the slit is situated adjacent to the intermediate image plane. In variations of the additional embodiments, the third set of optical components generates a Bessel-Gauss beam and operates by focusing a Gaussian beam using an axicon lens. In variations of the additional embodiments, the third set of optical components comprises a spatial light modulator. In variations of the additional embodiments, the linear array is situated at a position that coincides with the intermediate image plane.

In variations of the additional embodiments, the linear array is situated at a position that is remote from the intermediate image plane, and the imaging apparatus further comprises optical components arranged to (a) route light from the intermediate image plane to the linear array and (b) provide magnification. In variations of the additional embodiments, a wavelength-selective filter is positioned in the optical path of the detection light between the scanning element and the linear array that prevents light has the first wavelength from reaching the linear array. In variations of the additional embodiments, each of the light detecting elements of the linear array comprises a photodiode or a photomultiplier tube element. In variations of the additional embodiments, a beam splitter is arranged to (a) route the excitation light that was shaped by the third set of optical components towards the scanning element. and (b) route the detection light arriving from the scanning element through the second set of optical components.

In variations of the additional embodiments, the second set of optical components includes a second objective disposed at the distal end of the second set of optical components. In variations of the additional embodiments, optical components are provided that include a third objective arranged to route the excitation light that was shaped by the third set of optical components into the distal end of the second objective such that the excitation light will travel through the second set of optical components in a distal to proximal direction towards the scanning element. In variations of the additional embodiments, the first wavelength is at least 1 µm.

According to embodiments, the disclosed subject matter includes an imaging method. The method includes projecting a pulsed beam of NIR excitation light into a sample at an oblique angle at a sufficient intensity to induce 2-photon excitation of fluorescence within the sample. The method includes scanning the beam of excitation light through a volume in the sample at a speed that is sufficient to sweep the beam through a three-dimensional region of the sample at at least 10 volumes per second, with a resolution in each volume of at least 256×256×8 in the X, Y, and depth directions, respectively. The method includes imaging fluorescence that originates from the position of the beam of excitation light onto an intermediate image plane that remains stationary while the beam of excitation light is scanned. The method includes capturing, using a linear array of light detecting elements, a plurality of images of the intermediate image plane that correspond, respectively, to a plurality of different scanning orientations. The fluorescent light passes through an optical slit prior to arriving at the linear array of light detecting elements.

In variations of the foregoing method, the NIR excitation light has a wavelength of at least 1 µm. In further variations of the foregoing methods, the beam is a Bessel beam.

According to embodiments, the disclosed subject matter includes an imaging apparatus with a light source that generates a pulsed beam of light at a first wavelength, wherein the first wavelength is at least 620 nm. Beam shaping optics shape the beam of light from the light source into a beam of excitation light that comprises a series of spots at different depths. An optical system (a) projects the beam of excitation light into a sample at an oblique angle, wherein a position of the beam of excitation light within the sample varies depending on an orientation of a scanning element that provides two dimensional scanning of light, and (b) forms, from detection light that originates from the position of the beam of excitation light, an image at an intermediate image plane, wherein the intermediate image plane remains stationary regardless of the orientation of the scanning element, and wherein the detection light has a second wavelength that is shorter than the first wavelength. An array of light detecting elements is provided, wherein each of the light detecting elements is sensitive to the second wavelength, wherein the array is arranged to capture a plurality of second-wavelength images of the intermediate image plane that correspond, respectively, to a plurality of different positions and/or orientations of the scanning element or excitation beam. The orientation of the scanning element is controlled in two dimensions to cause the position of the beam of excitation light to sweep out a three-dimensional volume within the sample.

In the foregoing imaging apparatus embodiments, the beam shaping optics may include a spatial light modulator. In the foregoing imaging apparatus embodiments, the array may include a linear array is situated at a position that coincides with the intermediate image plane. The array may include a linear array is situated at a position that is remote from the intermediate image plane, and wherein the imaging apparatus further comprises optical components arranged to (a) route light from the intermediate image plane to the linear array and (b) provide magnification. The series of spots at different depths may be spaced apart at a spacing that is adjustable to facilitate 3-dimensional patterns for optogenetic stimulation.

According to embodiments, the disclosed subject matter includes an imaging method. The method includes generating a pulsed beam of light at a first wavelength of at least 620 nm. The method includes shaping the beam of light into a beam of excitation light that comprises a series of spots at different depths. The method includes projecting the beam of excitation light into a sample at an oblique angle, wherein a position of the beam of excitation light within the sample varies depending on an orientation of a scanning element, and wherein the orientation of the scanning element is controlled in two dimensions to cause the position of the beam of excitation light to sweep out a three-dimensional volume within the sample. The method includes controlling positions of the series of spots at different depths to achieve optogenetic stimulation of at least one target location in a living organism. The method includes forming, from detection light that originates from the position of the beam of excitation light, an image at an intermediate image plane, wherein the intermediate image plane remains stationary regardless of the orientation of the scanning element, and wherein the detection light has a second wavelength that is shorter than the first wavelength. The method includes capturing a plurality of second-wavelength images of the intermediate image plane that correspond, respectively, to a plurality of different positions and/or orientations of the scanning element or excitation beam. The shaping includes using a spatial light modulator.

In variations of the foregoing methods, the capturing includes using a linear array situated at a position that coincides with the intermediate image plane. In variations of the foregoing methods, the capturing uses a linear array situated at a position that is remote from the intermediate image plane.

According to embodiments, the disclosed subject matter includes a method of optical imaging comprising. The method includes transmitting excitation light towards an objective via a first optical path, wherein the first optical path includes a beam splitter and a first light scanning element. The method includes redirecting the excitation light towards a peripheral region of the objective such that the excitation light passes through the objective and forms an oblique beam in a tissue, wherein the position of the oblique imaging plane within the tissue varies depending on an orientation of the first light scanning element. The method includes routing return light from the oblique imaging plane and passing the return light through a stationary tilted intermediate image plane by descanning the return light. The method includes conveying a first part of the return light passing through the stationary tilted intermediate image plane to an image sensor through imaging optics and conveying a second part to a non-imaging photodetector.

In variations, the method further includes using a signal from the non-imaging detector to form a flat image with no depth resolution, where depth is resolved by the imaging detector by imaging light along a length of the excitation beam. In further variations, the foregoing methods include combining the signal from the light received by the non-imaging photodetector and the imaging sensor to enhance a three-dimensional representation of the distribution of return light in the tissue indicated by the signal received from the imaging sensor. In further variations, the foregoing methods are such that the enhancing includes adjusting the total variation in the three-dimensional distribution detected responsively to the variation along the non-depth axes indicated by the three-dimensional representation, whereby signal-to-noise in the three-dimensional representation is reduced. In further variations, the foregoing methods include outputting the flat image and a three-dimensional representation simultaneously on a display, responsively to signals from the non-imaging detector and the imaging sensor.

Note that any of the limitations of any of the following dependent claims depending from a common independent claim may be combined to define additional embodiments. The lack of an explicit recitation of these combinations is not provided purely for practical reasons. Such additional combinations of limitations are considered to be disclosed by the inventor.

It will be appreciated that the modules, processes, systems, and sections described above can be implemented in hardware, hardware programmed by software, software instruction stored on a non-transitory computer readable medium or a combination of the above. For example, a method for imaging intact biological structures can be implemented, for example, using a processor configured to execute a sequence of programmed instructions stored on a non-transitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, LabVIEW, or another structured or object-oriented programming language. The sequence of programmed instructions and data associated therewith can be stored in a non-transitory computer-readable medium such as a computer memory or storage device which may be any suitable memory apparatus, such as, but not limited to read-only memory (ROM), programmable read-only memory (PROM), electrically erasable programmable read-only memory (EEPROM), random-access memory (RAM), flash memory, disk drive and the like.

Furthermore, the modules, processes, systems, and sections can be implemented as a single processor or as a distributed processor. Further, it should be appreciated that the steps mentioned above may be performed on a single or distributed processor (single and/or multi-core). Also, the processes, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, or the like. In general, any process capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of control systems, optics, and tissue fixation and/or computer programming arts.

Moreover, embodiments of the disclosed method, system, and computer program product can be implemented in software executed on a programmed general purpose computer, a special purpose computer, a microprocessor, or the like.

It is, thus, apparent that there is provided, in accordance with the present disclosure, imaging devices, methods, and system. Many alternatives, modifications, and variations are enabled by the present disclosure. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

What is claimed is:

1. An imaging apparatus comprising:
   a light source that generates a pulsed beam of excitation light at a first wavelength, wherein the first wavelength is at least 620 nm;
   an optical system that (a) projects the beam of excitation light into a sample at an oblique angle, wherein a position of the beam of excitation light within the sample varies depending on an orientation of a scanning element that provides two dimensional scanning of light, and (b) forms, from detection light that originates from the position of the beam of excitation light, a linear image at an intermediate image plane, wherein different points on the linear image correspond to different depths within the sample, wherein the linear image at the intermediate image plane remains stationary regardless of the orientation of the scanning element, and wherein the detection light has a second wavelength that is shorter than the first wavelength; and
   a linear array of light detecting elements, wherein each of the light detecting elements is sensitive to the second wavelength, wherein the linear array is arranged to capture a plurality of second-wavelength linear images of the intermediate image plane that correspond, respectively, to a plurality of different positions and/or orientations of the scanning element or excitation beam; and
   an optical slit positioned in an optical path of the detection light between the scanning element and the linear array, wherein the orientation of the scanning element is controlled to cause the position of the beam of excitation light to sweep out a three dimensional volume within the sample.

2. The imaging apparatus of claim 1, wherein the optical slit is situated adjacent to the intermediate image plane.

3. The imaging apparatus of claim 1, wherein the beam is a Bessel beam of excitation light that is generated using a spatial light modulator.

4. The imaging apparatus of claim 1, wherein the linear array is situated at a position that coincides with the intermediate image plane.

5. The imaging apparatus of claim 1, wherein the linear array is situated at a position that is remote from the intermediate image plane, and wherein the imaging apparatus further comprises optical components arranged to (a) route light from the intermediate image plane to the linear array and (b) provide magnification.

6. The imaging apparatus of claim 1, further comprising a wavelength-selective filter positioned in the optical path of the detection light between the scanning element and the linear array that prevents light having the first wavelength from reaching the linear array.

7. The imaging apparatus of claim 1, wherein each of the light detecting elements of the linear array comprises a photodiode or a photomultiplier tube element.

8. An imaging apparatus comprising:
a first set of optical components having a proximal end and a distal end, wherein the first set of optical components includes a first objective disposed at the distal end of the first set of optical components;
a second set of optical components having a proximal end and a distal end;
a light source that generates a pulsed output beam with a first wavelength, wherein the first wavelength is at least 620 nm;
a third set of optical components arranged to shape the output beam generated by the light source into a Bessel beam shaped beam of excitation light;
a scanning element that provides two-dimensional scanning of light, the scanning element disposed proximally with respect to the proximal end of the first set of optical components and proximally with respect to the proximal end of the second set of optical components,
wherein the scanning element is arranged to route the beam of excitation light so that the beam of excitation light will pass through the first set of optical components in a proximal to distal direction and project into a sample that is positioned distally beyond the distal end of the first set of optical components, wherein the beam of excitation light is projected into the sample at an oblique angle, and wherein the beam of excitation light is projected into the sample at a position that varies depending on an orientation of the scanning element,
wherein the first set of optical components routes detection light from the sample in a distal to proximal direction back to the scanning element, wherein the detection light has a second wavelength that is shorter than the first wavelength, and
wherein the scanning element is also arranged to route the detection light that arrives via the first set of optical components so that the detection light will pass through the second set of optical components in a proximal to distal direction and form an intermediate image plane at a stationary position that is distally beyond the distal end of the second set of optical components; and
a linear array of light detecting elements, wherein each of the light detecting elements is sensitive to the second wavelength, wherein the linear array is arranged to capture a plurality of second-wavelength linear images of the intermediate image plane that correspond, respectively, to a plurality of different positions and/or orientations of the scanning element or excitation beam, wherein different points in each of the plurality of second-wavelength linear images correspond to different depths within the sample; and
an optical slit positioned in an optical path of the detection light between the scanning element and the linear array,
wherein the orientation of the scanning element is controlled to cause the position of the beam of excitation light to sweep out a three-dimensional volume within the sample.

9. The imaging apparatus of claim 8, wherein the optical slit is situated adjacent to the intermediate image plane.

10. The imaging apparatus of claim 8, wherein the third set of optical components generates a Bessel-Gauss beam and operates by focusing a Gaussian beam using an axicon lens.

11. The imaging apparatus of claim 8, wherein the third set of optical components comprises a spatial light modulator.

12. The imaging apparatus of claim 8, wherein the linear array is situated at a position that coincides with the intermediate image plane.

13. The imaging apparatus of claim 8, wherein the linear array is situated at a position that is remote from the intermediate image plane, and wherein the imaging apparatus further comprises optical components arranged to (a) route light from the intermediate image plane to the linear array and (b) provide magnification.

14. The imaging apparatus of claim 8, further comprising a wavelength-selective filter positioned in the optical path of the detection light between the scanning element and the linear array that prevents light having the first wavelength from reaching the linear array.

15. The imaging apparatus of claim 8, wherein each of the light detecting elements of the linear array comprises a photodiode or a photomultiplier tube element.

16. The imaging apparatus of claim 8, further comprising:
a beam splitter arranged to (a) route the excitation light that was shaped by the third set of optical components towards the scanning element; and (b) route the detection light arriving from the scanning element through the second set of optical components.

17. The imaging apparatus of claim 8, wherein the second set of optical components includes a second objective disposed at the distal end of the second set of optical components.

18. The imaging apparatus of claim 17, further comprising:
optical components including a third objective arranged to route the excitation light that was shaped by the third set of optical components into the distal end of the second objective such that the excitation light will travel through the second set of optical components in a distal to proximal direction towards the scanning element.

19. An imaging method comprising:
projecting a pulsed beam of NIR excitation light into a sample at an oblique angle at a sufficient intensity to induce 2-photon excitation of fluorescence within the sample;
scanning the beam of excitation light through a volume in the sample at a speed that is sufficient to sweep the beam through a three-dimensional region of the sample at at least 10 volumes per second, with a resolution in each volume of at least 256×256×8 in the X, Y, and depth directions, respectively;
imaging fluorescence that originates from the position of the beam of excitation light onto an intermediate image plane that remains stationary while the beam of excitation light is being scanned; and
capturing, using a linear array of light detecting elements, a plurality of linear images of the intermediate image plane that correspond, respectively, to a plurality of different scanning orientations, wherein different points in each of the plurality of second-wavelength linear images correspond to different depths within the sample,
wherein the fluorescent light passes through an optical slit prior to arriving at the linear array of light detecting elements.

20. The apparatus of claim 19, wherein the excitation beam is a Bessel beam.

* * * * *

UNITED STATES PATENT AND TRADEMARK OFFICE
CERTIFICATE OF CORRECTION

| | |
|---|---|
| PATENT NO. | : 11,036,037 B2 |
| APPLICATION NO. | : 16/348014 |
| DATED | : June 15, 2021 |
| INVENTOR(S) | : Elizabeth M. C. Hillman |

It is certified that error appears in the above-identified patent and that said Letters Patent is hereby corrected as shown below:

In the Specification

Column 1, Lines 18 and 19, please replace "grants NS094296, NS076628, NS063226, and NS053684 awarded by the National Institutes of Health" with -- grants NS094296, NS076628, and NS063226 awarded by the National Institutes of Health --.

Signed and Sealed this
Seventh Day of November, 2023

Katherine Kelly Vidal
*Director of the United States Patent and Trademark Office*